United States Patent
Kokubo et al.

(10) Patent No.: US 6,636,777 B1
(45) Date of Patent: Oct. 21, 2003

(54) TOOL-POSITIONING METHOD, TOOL-POSITIONING DEVICE AND POWER FEEDER FOR TOOL POSITIONING

(75) Inventors: Kunihiro Kokubo, Kawagoe (JP); Takeshi Okabe, Hino (JP); Masahiko Watanabe, Sakado (JP)

(73) Assignee: Citizen Watch Co., Ltd., Nishitokyo ( * ) Notice: Subject to any disclaimer, the term of this patent is extended or adjusted under 35 U.S.C. 154(b) by 0 days.

(21) Appl. No.: 09/936,524
(22) PCT Filed: Mar. 16, 2000
(86) PCT No.: PCT/JP00/01613
  § 371 (c)(1),
  (2), (4) Date: Sep. 14, 2001
(87) PCT Pub. No.: WO00/54913
  PCT Pub. Date: Sep. 21, 2000

(30) Foreign Application Priority Data

Mar. 16, 1999 (JP) .............................. 11-070566

(51) Int. Cl.⁷ .......................... G06F 19/00; B23B 3/00
(52) U.S. Cl. .......................... 700/193; 700/192; 82/173
(58) Field of Search ................... 700/192, 193; 82/1.11, 151, 173; 29/407.09

(56) References Cited

U.S. PATENT DOCUMENTS

| | | | | |
|---|---|---|---|---|
| 4,554,495 A | * | 11/1985 | Davis | 318/572 |
| 4,646,596 A | * | 3/1987 | Edwards et al. | 82/19 |
| 4,776,247 A | * | 10/1988 | Kiya | 82/118 |
| 5,513,113 A | * | 4/1996 | Okada et al. | 700/179 |
| 5,715,167 A | * | 2/1998 | Gupta et al. | 700/186 |
| 5,779,405 A | * | 7/1998 | Aiso et al. | 409/132 |
| 5,802,937 A | | 9/1998 | Day et al. | |

FOREIGN PATENT DOCUMENTS

| | | |
|---|---|---|
| JP | 62-162446 | 7/1987 |
| JP | 5329702 | 12/1992 |
| JP | 7-060505 | 3/1995 |
| JP | 8-118103 | 5/1996 |
| JP | 10-20911 | 1/1998 |

* cited by examiner

Primary Examiner—Leo Picard
Assistant Examiner—Elliot Frank
(74) Attorney, Agent, or Firm—Finnegan, Henderson, Farabow, Garrett & Dunner, L.L.P.

(57) ABSTRACT

A power feeder (10) includes a flexible strip (12) having a conducting front side (12a) and an insulating back side (12b); a retainer unit (20) for holding the strip wrapped on a bar (18) with the back side being in close contact with the bar; a feeder unit (22) connected electrically with the front side of the strip; and a base (26) mounted detachably on the headstock (24) of an automatic lathe. A tool-positioning device (14) including this power feeder includes a driving unit (60) for bringing a tool (56) to be positioned into contact with the front side of the strip; a section (62) for detecting a conduction between the tool and the front side of the strip through the feeder unit to determine the position of contact with the tool; and a corrective processing section (64) for determining the position of a center axis (18a) of the bar based on the position of the determined position of contact with the tool.

30 Claims, 17 Drawing Sheets

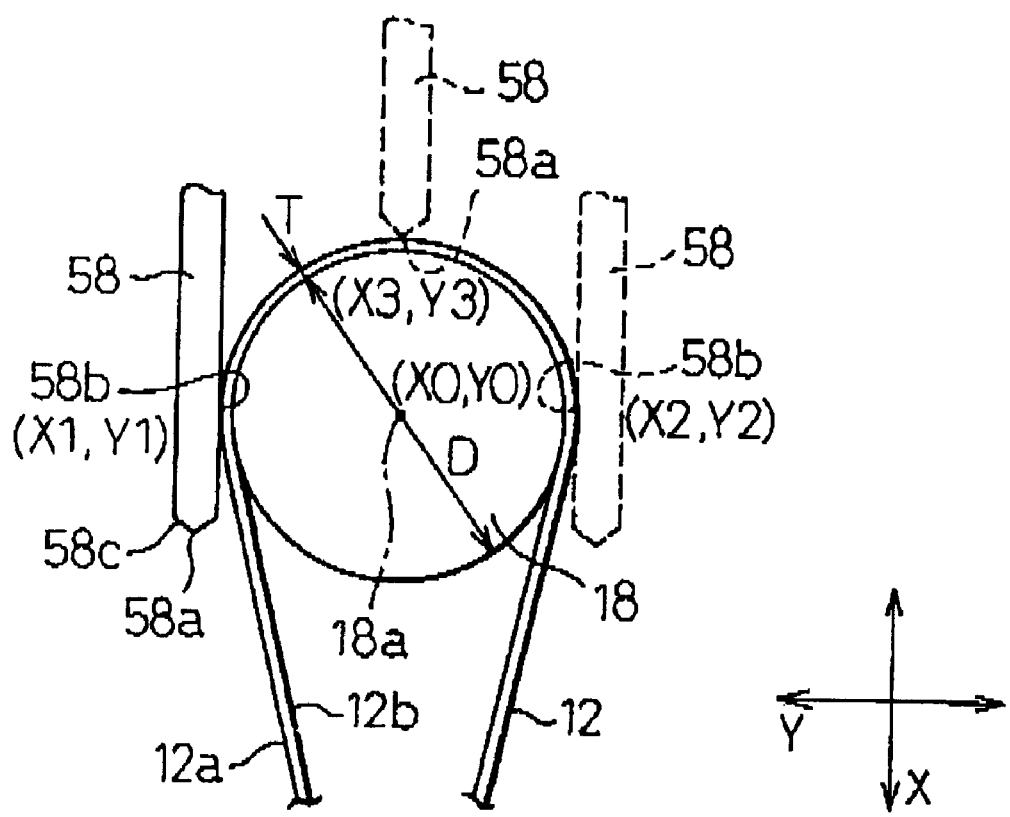

TOOL-POSITIONING METHOD, TOOL-POSITIONING DEVICE AND POWER FEEDER FOR TOOL POSITIONING

TECHNICAL FIELD

The present invention relates to a tool-positioning method and a tool-positioning device, for positioning the tip end of a tool relative to the center axis of a bar. The present invention also relates to a power feeder for tool positioning, that can be used for positioning the tip end of a tool relative to the center axis of a bar.

BACKGROUND ART

For machining an external peripheral surface of a bar-shaped workpiece (hereinafter referred to as a bar) with a lathe, the machining work is usually started after the tip end of a tool, such as a turning tool, mounted on a tool rest, is positioned in relation to a center line or axis of the bar. For example, in a case where a tool rest (hereinafter referred to as a flat turret) for supporting a plurality of tools in a parallel arrangement is installed on a machine tool (hereinafter referred to as an automatically operated lathe), such as an NC lathe, capable of automatically carrying out various kinds of machining processes including mainly turning, the flat turret is usually structured to be able to move in parallel in rectangular two-axis directions (e.g., X-axis and Y-axis directions) within a plane orthogonal to the center axis of a bar securely held in a rotary spindle. In this structure, for machining the bar with a desired tool, the target position or path of the tip end of the tool is set on X-Y coordinates, while the positional coordinates of the center axis of the bar in the X-Y coordinate system on the lathe bed are considered as a reference or origin.

At the time of selecting a tool, for example, the flat turret is moved in parallel or translated in the Y-axis direction (along the parallel array of the tools), at a location where the tip ends of tools mounted on the flat turret are not brought into contact with the bar. Then, at the instant when the tip end of the desired tool to be selected has been aligned with the center axis of the bar in the X-axis direction, the selection of the tool is completed. From this position, the flat turret is moved in parallel in the X-axis direction, and the tip end or nose of the selected tool is abutted with the bar to start the machining. In the case where the selected tool is a turning tool, for example, the X-axis feed rate of the flat turret is controlled so as to determine a cut depth by the turning tool on the bar as well as a setback or standby position of the nose during a non-use period of the turning tool. It should be noted that the term "the tip end of a tool" or "the nose of a tool" in this specification shows a portion of the tool, that is first brought into contact with the bar for starting the machining.

The above-described feed motions of the flat turret in the Y-axis direction (at the time of selecting a tool) and in the X-axis direction (at the time of machining) are carried out in accordance with the predetermined coordinate data for the position of the tool selected on the flat turret and for the target position of the tip end of the selected tool during the machining work. Therefore, in order to perform high precision machining, it is necessary that the positional coordinate data of the selected tool has been set accurately in relation to the center of the bar as reference, regardless of the kind of the selected tool. However, depending on the differences between the nose shapes and/or the tip-end abrasion levels of the selected tools, the actual move position of the tool nose may be deviated from the predetermined coordinates, even when the flat turret has been fed properly in accordance with the predetermined data. In order to eliminate such an inconvenience, it is required to correct the predetermined coordinate data of each tool before starting the machining work. In this respect, the meaning of the term "positioning" in this specification includes such a correction of the predetermined coordinate data.

Such a preliminary positioning operation of tools is usually performed each time when the tools are replaced with each other, in the typical case where a plurality of tools are used for machining one bar. Therefore, it is advantageous to automatically perform the positioning operation under a predetermined control flow, as a preparatory step in a sequence of automatic machining works in an automatically operated lathe. For example, Japanese Unexamined Patent Publication (Kokai) No. 8-118103 (JP-A-8-118103) discloses a device for automatically performing the above-described positioning operation of the tip end of a tool prior to the machining work.

This known device includes tool abutting means for bringing a turning tool into contact with an external peripheral surface of a bar, contact-position deciding means for deciding a position of contact between the bar and the turning tool, and processing or operating means for calculating a position of a center axis of the bar on the basis of the decided contact-position data. The tool abutting means sequentially brings the nose of a turning tool into contact with at least three different positions in peripheral and axial directions on the external peripheral surface of the bar in rotation, and at each time of contact, the contact-position deciding means decides a position of contact. Then, the processing means determines a position of the center axis of the bar (i.e., a calculated center value) on the basis of at least three contact-position data of the turning tool nose thus decided. The turning tool is fed to a position set in relation to this calculated center value as reference. When the turning tool is replaced or changed with another one, a calculated center value is determined for the next turning tool in the same procedure as described, and the old calculated center value is re-written at each time of the tool change.

According to the above conventional device for positioning the tip end of a tool, the contact position is decided by directly abutting the nose of the turning tool onto the external peripheral surface of the rotating bar, so as to determine the calculated center value of the bar. Therefore, before the machining of the bar is started, the external peripheral surface of the bar is cut slightly. Even when the bar is not rotated, there is a risk that the external peripheral surface of the bar is damaged by the nose of the turning tool. It is thus required to abut the nose onto the bar at a position permitting such a cutting or damage, so that it becomes essential to select the position of contact with the tool. Further, there is a risk of abrasion or damaging of the nose of the turning tool, during the positioning of a tool tip end as a preparatory step of the machining work, which may shorten the life of the turning tool in the actual machining work.

DISCLOSURE OF THE INVENTION

It is, therefore, an object of the present invention to provide a tool-positioning method and a tool-positioning device, capable of easily and accurately positioning the tip end of a tool relative to the center axis of a bar without damaging the external peripheral surface of the bar and/or the tool in itself.

It is another object of the present invention to provide a power feeder or excitation device for tool positioning, capable of being used for the positioning operation of a tool and capable of preventing the external peripheral surface of a bar and/or the tool in itself from being damaged.

In order to achieve the above objects, the present invention provides a tool-positioning method for positioning a tip end of a tool relative to a center axis of a bar, comprising providing a flexible strip member having a conducting front side and an insulating back side; fixedly disposing a bar to be machined at a machining work position, and wrapping the strip member on an external peripheral surface of the bar with the back side being closely attached to the external peripheral surface; bringing a tool to be positioned into contact with the front side of the strip member; detecting a conduction between the tool and the front side of the strip member at a time of a mutual contact, to decide a position of a contact point with the tool; and determining a position of a tip end of the tool during a machining, on the basis of the position of the contact point with the tool as decided.

In this tool-positioning method, the determining of a position of a tip end of the tool may include a work of determining a position of a center axis of the bar to be machined on the basis of the position of the contact point with the tool as decided, and a work of suitably correcting predetermined machining-position data of the tool in accordance with the position of the center axis of the bar as determined.

Alternatively, the determining of a position of a tip end of the tool may include a work of mechanically positioning the tip end of the tool relative to a center axis of the bar to be machined, on the basis of the position of the contact point with the tool as decided.

The present invention also provides a tool-positioning device for positioning a tip end of a tool relative to a center axis of a bar, comprising a flexible strip member having a conducting front side and an insulating back side; a wrapping mechanism for keeping the strip member wrapped on an external peripheral surface of a bar to be machined, the bar being fixedly disposed at a machining work position, with the back side of the strip member being closely attached to the external peripheral surface; a driving mechanism for bringing a tool to be positioned into contact with the front side of the strip member; a power feeding mechanism for allowing an electric current to flow between the tool and the front side of the strip member at a time of mutual contact; a contact-position deciding section for detecting a conduction between the tool and the front side of the strip member caused due to the power feeding mechanism, to decide a position of a contact point with the tool; and a corrective processing section for determining a position of a center axis of the bar on the basis of the position of the contact point with the tool as decided, and suitably correcting predetermined machining-position data of the tool in accordance with the position of the center axis of the bar as determined.

In this tool-positioning device, it is advantageous that the tool is mounted on a tool rest of an automatically operated lathe, and the driving mechanism comprises a tool-rest driving mechanism in the automatically operated lathe.

Also, the contact-position deciding section and the corrective processing section may include a controlling section in an automatically operated lathe.

The present invention further provides a tool-positioning device for positioning a tip end of a tool relative to a center axis of a bar, comprising a flexible strip member having a conducting front side and an insulating back side; a wrapping mechanism for keeping the strip member wrapped on an external peripheral surface of a bar to be machined, the bar being fixedly disposed at a machining work position, with the back side of the strip member being closely attached to the external peripheral surface; a driving mechanism for bringing a tool to be positioned into contact with the front side of the strip member; a power feeding mechanism for allowing an electric current to flow between the tool and the front side of the strip member at a time of mutual contact; a contact-position deciding section for detecting a conduction between the tool and the front side of the strip member caused due to the power feeding mechanism, to decide a position of a contact point with the tool; and a positioning member for mechanically positioning a tip end of the tool relative to a center axis of the bar to be machined, on the basis of the position of the contact point with the tool as decided.

In this tool-positioning device, it is advantageous that the tool is mounted on a tool rest of an automatically operated lathe, and the driving mechanism comprises a tool-rest driving mechanism in the automatically operated lathe.

Also, the contact-position deciding section may include a controlling section in an automatically operated lathe.

Also, the positioning member may comprise a holder for fixedly supporting the tool, and a spacer mounted on the holder for determining a position of the tool.

The present invention yet further provides a power feeder for tool positioning, for positioning a tip end of a tool relative to a center axis of a bar, comprising a flexible strip member having a conducting front side and an insulating back side; a wrapping mechanism for keeping the strip member wrapped on an external peripheral surface of a bar, with the back side of the strip member being closely attached to the external peripheral surface; and a power feeding mechanism electrically connected to the front side of the strip member.

In this power feeder, it is preferred that the strip member has an annular shape.

Also, it is advantageous that the wrapping mechanism includes a tension unit for applying tension to the strip member.

It is also advantageous that the wrapping mechanism includes a guide unit for closely attaching the strip member to a portion of the external peripheral surface of the bar over a central angle of 180 degrees or above.

Alternatively, the wrapping mechanism may include an adhesive for detachably adhering the back side of the strip member to the external peripheral surface of the bar.

The power feeder is capable of being detachably installed on a spindle stock of an automatically operated lathe.

In this arrangement, the power feeding mechanism preferably includes an electrode member contacting with the front side of the strip member and insulated from the spindle stock.

BRIEF DESCRIPTION OF THE DRAWINGS

The above and other objects, features and advantages of the present invention will become more apparent from the following description of the preferred embodiments in relation to the attached drawings, wherein:

FIG. 7C is a schematic diagram showing a concept of three-point contact method with a drill, for explaining the tool-abutting step;

BEST MODE FOR CARRYING OUT THE INVENTION

Figure 1:
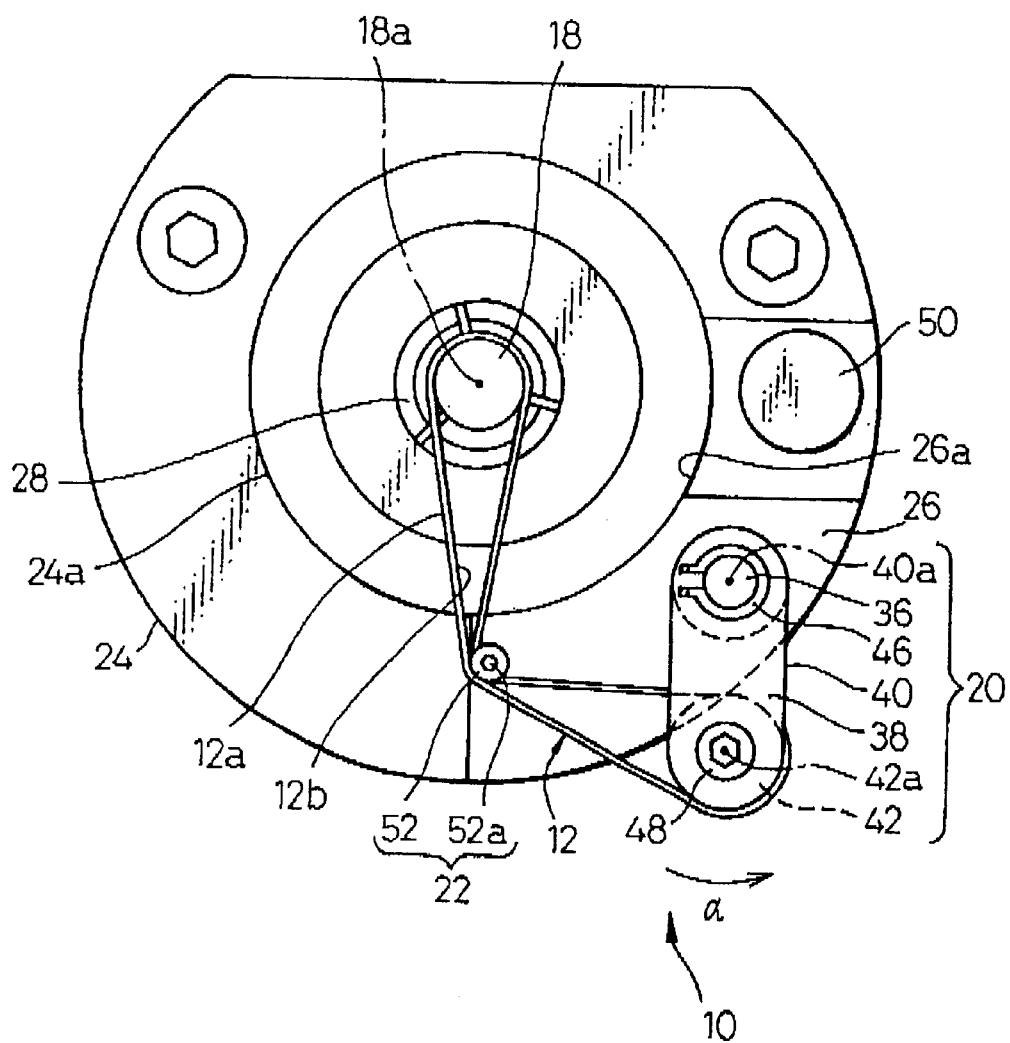
FIG. 1 is a front view of a power feeder for tool positioning, according to the first embodiment of the present invention.
Figure 2:
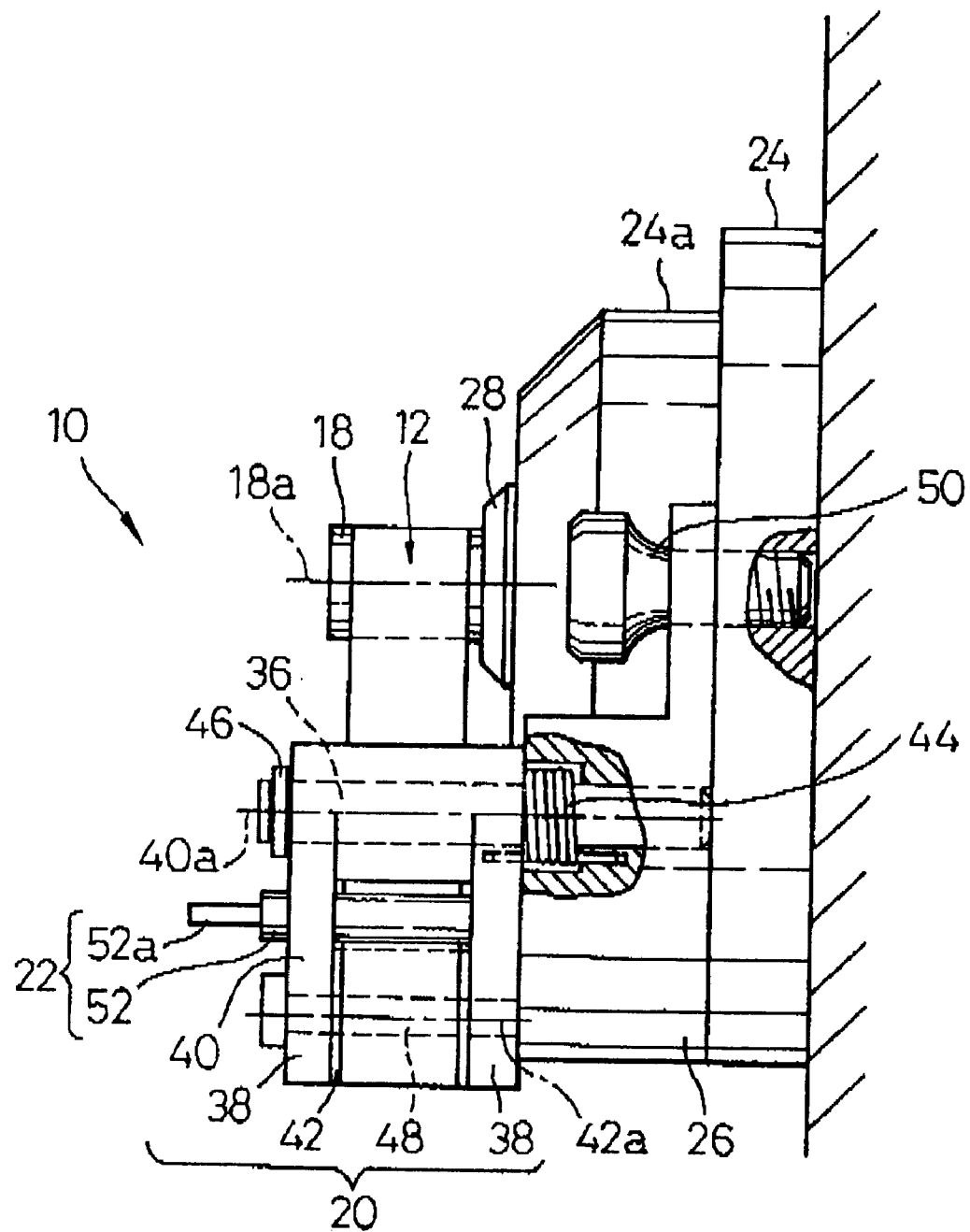
FIG. 2 is a partially sectional side view of the power feeder shown in FIG. 1.
Figure 3A:
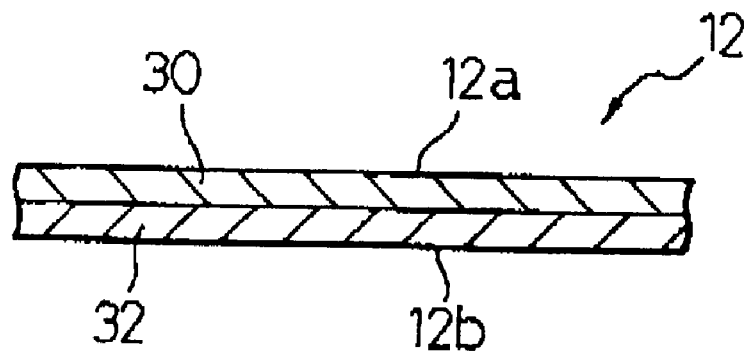
FIG. 3A is a sectional view of a strip member used in the power feeder shown in FIG. 1.
Figure 3B:
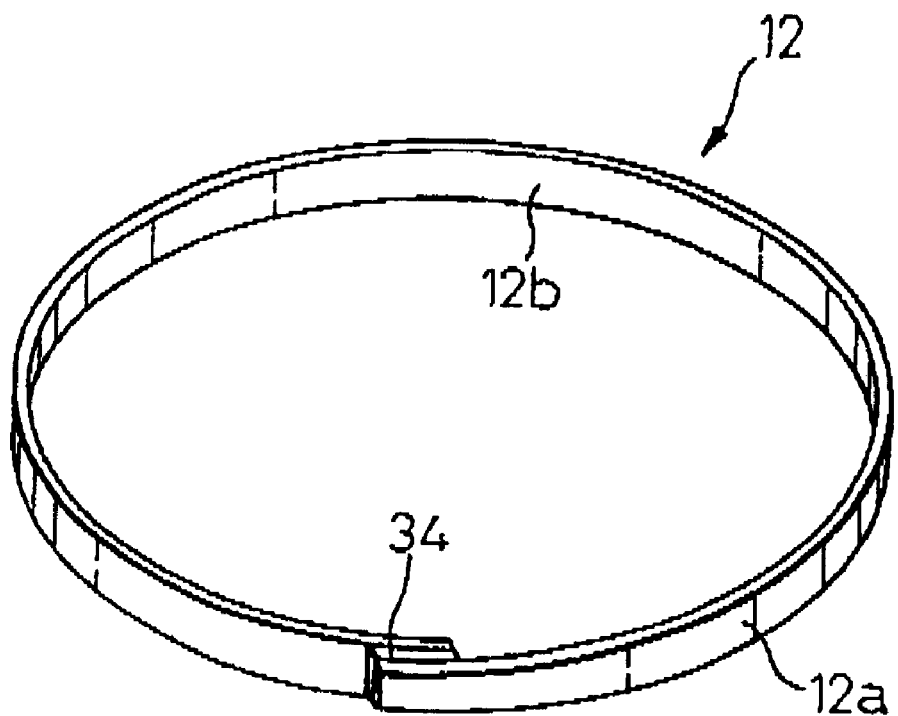
FIG. 3B is a perspective view of the strip member.
Figure 4:
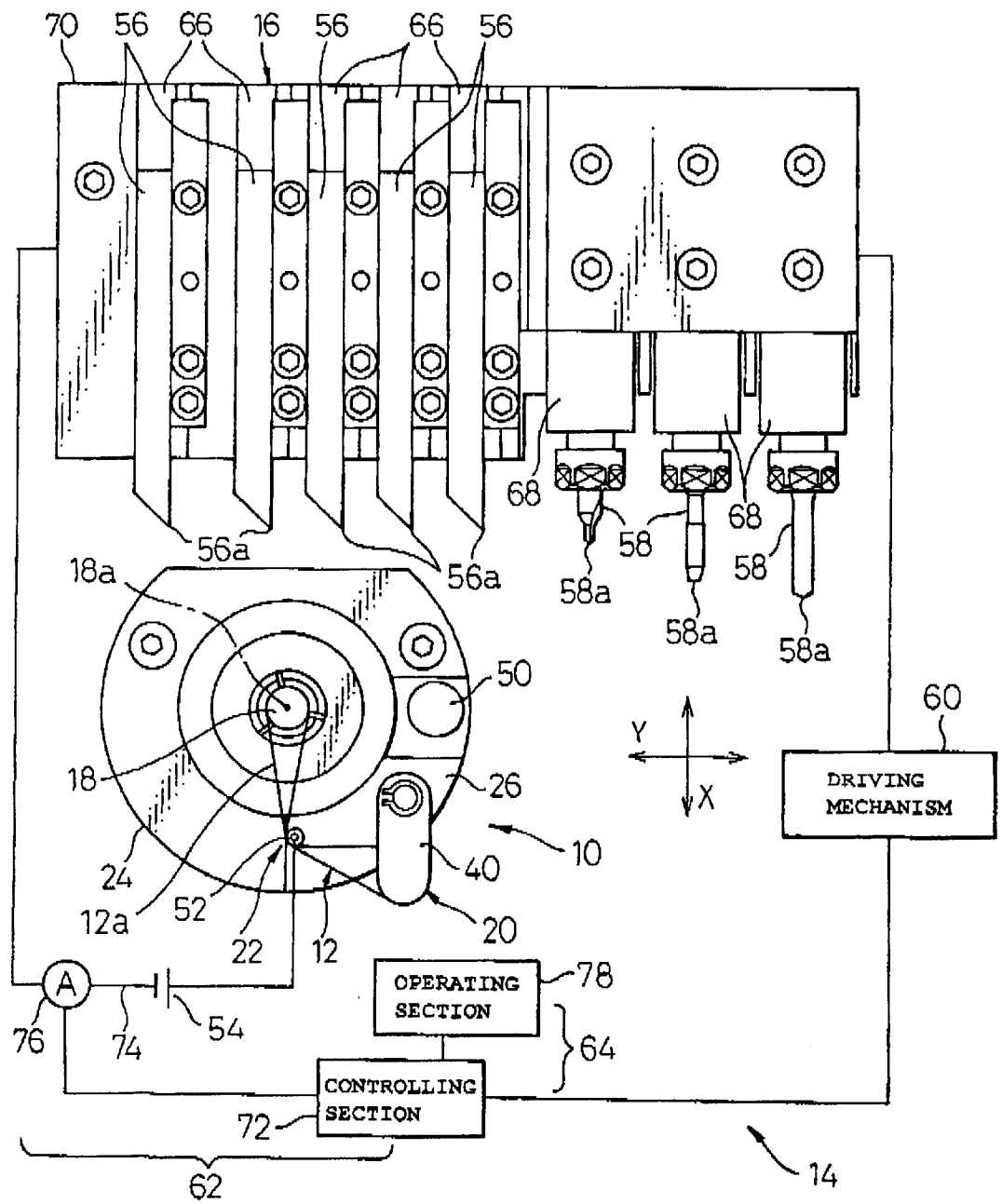
FIG. 4 is a front view of a tool-positioning device, according to one embodiment of the present invention, and partially shown in a block diagram, together with a bar and a flat turret.
Figure 5:
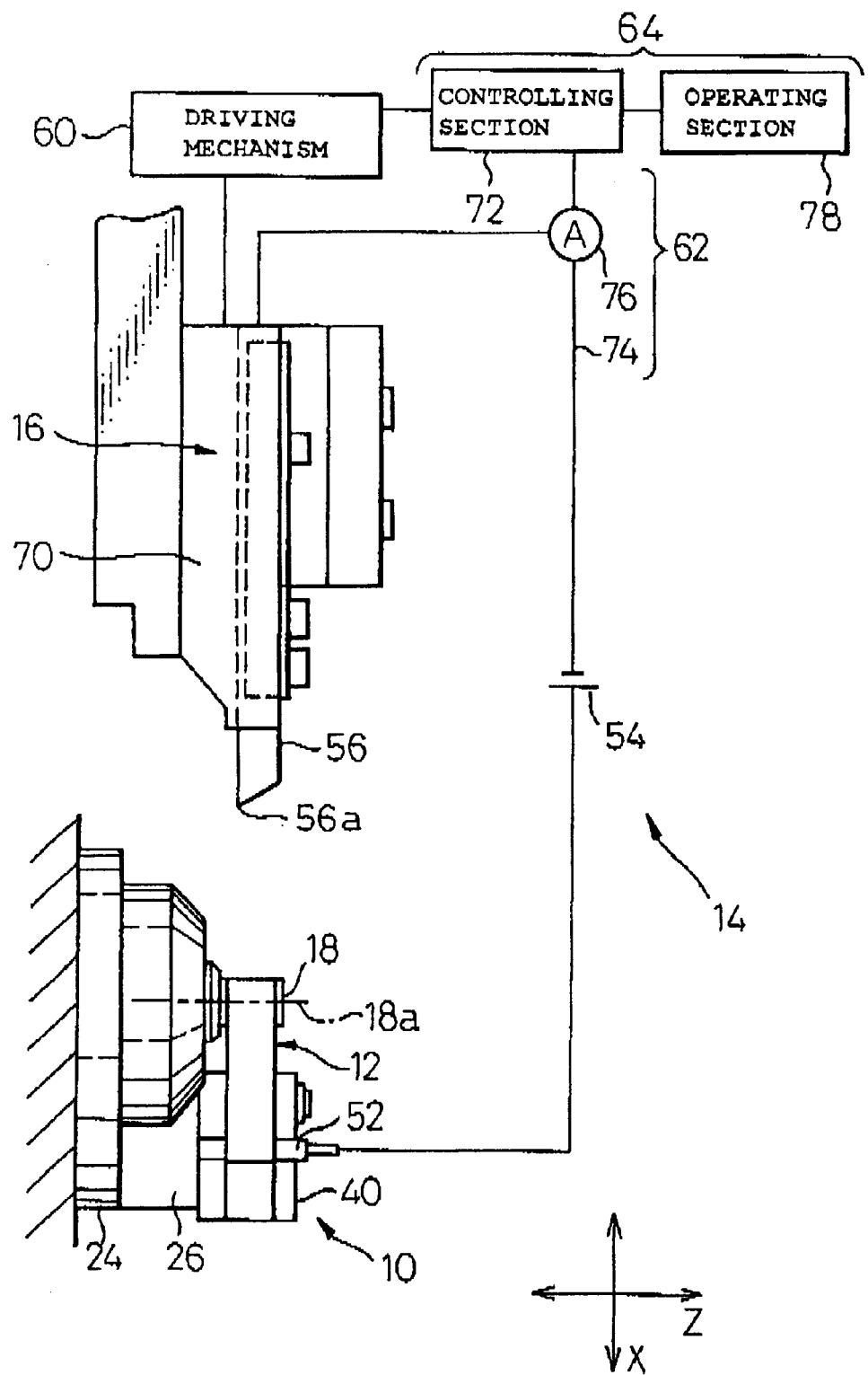
FIG. 5 is a side view of the tool-positioning device in FIG. 4, partially shown in a block diagram, together with the bar and the flat turret.

Referring to the drawings, FIGS. 1 and 2 are diagrams showing a power feeder 10 for tool positioning, according to the first embodiment of the present invention, FIGS. 3A and 3B are diagrams showing a strip member 12 used in the power feeder 10, FIGS. 4 and 5 are diagrams showing a tool-positioning device 14 equipped with the power feeder 10, according to one embodiment of the present invention. In the drawings, the same or similar components are denoted by common reference numerals. The positioning device 14 according to the illustrated embodiment is installed in association with a flat turret 16 mounted on an automatically operated lathe. However, the positioning device according to the present invention is not limited to this application, but may be installed in association with the other tool rests, such as a turret tool rest.

As shown in FIGS. 1 and 2, the power feeder or excitation device 10 includes a flexible strip member 12 having an electrically conducting front side 12a and an electrically insulating back side 12b; a wrapping mechanism or retainer unit 20 for holding the strip member 12 wrapped on the external peripheral surface of a bar 18 to be machined, the bar being fixedly disposed at a machining location, with the back side 12b being in close contact with the external peripheral surface; and a power feeding mechanism or feeder unit 22 connected electrically with the front side 12a of the strip member 12. The power feeder 10 also includes a base 26 mounted detachably on a spindle stock 24 of an automatically operated lathe, at a location around an end portion to be machined of the bar 18 securely held in a rotary spindle (not shown) incorporated in the spindle stock 24. As described later, the base 26 supports main components of the power feeder 10. The drawings show the bar 18 held in either a collet chuck 28 of the rotary spindle or a guide bush 28 optionally disposed in front of the rotary spindle.

The strip member 12 has a laminated structure formed from a front layer 30, constituting the front side 12a, made of an electrically conducting lamination of metal such as copper or aluminum, and a back layer 32, constituting the back side 12b, made of an electrically insulating lamination of resin such as polyimide, with both layers being mutually fixedly attached through, e.g., an adhesive (FIG. 3A). The strip member 12 has an annular shape formed by fixedly attaching one longitudinal end area of the front side 12a to the other longitudinal end area of the back side 12b through a fixing member 34 such as a double-coated adhesive tape (FIG. 3B).

The wrapping mechanism 20 includes a tension unit for applying a tension force to the strip member 12 wrapped on the bar 18. The tension unit includes a swing frame 40 fitted through a pivot 36 to the base 26 and having a pair of arms 38 defining a U-shaped cross section; a roller 42 carried on the arms 38 of the swing frame 40 at the free-end sides thereof; and an elastic member 44 for biasing the swing frame 40 about the pivot 36 in a counterclockwise direction (an arrow cc) in FIG. 1. The pivot 36 is embedded at one end thereof in the base 26 to be fixed thereto by, e.g., an adhesive, and supports at a length thereof projecting from the base 26 the swing frame 40 in a rotatable manner. The other end of the pivot 36 is engaged with a C ring 46 for preventing the swing frame 40 from falling out of the pivot. The roller 42 is rotatably supported between the pair of arms 38 with a bolt 48 screwed into the free ends of the arms 38. The elastic member 44 is formed from, e.g., a torsion spring received in the base 26 while surrounding the pivot 36, and applies the above-described biasing force to the swing frame 40, corresponding to the rotation angle of the latter.

The base 26 has a curved shape extending in a circular arc over a range of central angle of about 90 degrees, and is fixed at one longitudinal end thereof to the spindle stock 24 with a fixing screw 50. In this respect, an arcuate inside face 26a of the base 26 is in close contact with the outer circumferential surface of a cylindrical portion 24a of the spindle stock 24, so that the base 26 is fixedly arranged at a predetermined position on the spindle stock 24. In this state, the rotation axes 40a and 42a of the swing frame 40 and the roller 42 are disposed approximately in parallel with the rotation axis of the rotary spindle, i.e., the center axis 18a of the bar 18.

The annular strip member 12 is stretched between the bar 18 and the roller 42 with the back side 12b thereof being in contact with the respective external peripheral surfaces of the bar 18 and the roller 42, and is kept, under the tension applied due to the biasing function of the elastic member 44, in a condition where the back side 12b is closely attached with the respective external peripheral surfaces of the bar 18 and the roller 42. When the fixing screw 50 is loosened to remove the base 26 from the spindle stock 24 and the strip member 12 is detached from the bar 18, the strip member 12 is held by the pair of arms 38 and the roller 42 so as not to fall out of the swing frame 40.

The wrapping mechanism 20 also includes a guide unit for guiding the strip member 12 wrapped on the bar 18, and closely attaching the strip member 12 to the portion of the external peripheral surface of the bar 18 over the central angle of 180 degrees or above. In the illustrated embodiment, the guide unit is constructed from an electrode pole 52 fixedly and uprightly provided on the base 26 at the other end of the base 26 opposite to the fixing screw 50. The electrode pole 52 has a cylindrical shape, and is fixed at one end thereof to the base 26 through an adhesive or the like. A portion of the electrode pole 52, projecting from the base 26, slidably supports the front side 12a of the strip member 12.

When the base 26 has been fixed to a predetermined position on the spindle stock 24, the electrode pole 52 extends generally in parallel with the rotation axis of the rotary spindle, i.e., the center axis 18a of the bar 18, and is located to be laterally deviated from a straight line linking the center of the bar 18 to the center of the roller 42 of the tension unit. Therefore, in this state, it is possible to hook the strip member 12, stretched between the bar 18 and the roller 42, around the electrode pole 52 with the front side 12a thereof being in contact with the external peripheral surface of the electrode pole 52. In this condition, under the tension due to the biasing function of the elastic member 44 of the tension unit, the annular strip member 12 is stretched in such a manner as to converge on the electrode pole 52 as shown, so that the back side 12b of the strip member 12 is closely attached to the portion of the external peripheral surface of the bar 18 over a central angle of 180 degrees or above.

In the illustrated embodiment, the power feeding mechanism 22 is structured by the above-described electrode pole 52. The electrode pole 52 is made of an electrically conductive material. A joint terminal 52a for an external power source 54 (FIG. 4) is formed on the distal end of the electrode pole 52 projecting from the base 26. When the base 26 has been fixed to a predetermined position on the spindle stock 24, the electrode pole 52 functions as the guide unit and, at the same time, acts to come into conductive contact with the front side 12a of the strip member 12 so as to electrically connect the front side 12a to the external power source 54.

Furthermore, the electrode pole 52 is electrically insulated from the spindle stock 24 on which the base 26 has been installed. The strip member 12 is also electrically insulated from the bar 18 through the back side 12b thereof. Consequently, in a tool-positioning operation described later, it is ensured that no electric current flows between a tool and the strip member 12 until they are brought into contact or abutted with each other, and that electrical conduction or an electric current flow between them is capable of being detected at the same time as being,mutually contacted or abutted. To this end, for example, the base 26 may be made of an insulating resinous material, or an insulating material may be interposed between the base 26 and the electrode pole 52.

In this embodiment and the other embodiments described later, the electrode pole fixedly standing on the base of the power feeder is constructed to have both functions of the guide unit of the wrapping mechanism and the power feeding mechanism. However, the structure is not limited to this, and another bar-shaped member functioning as a guide unit may be provided uprightly on the base of the power feeder independently of the electrode pole functioning as a power feeding mechanism. In this case, the other electrically connecting means, such as a clip, may also be adopted as a power feeding mechanism.

The structure of the positioning device 14 including the power feeder 10 will be explained below, in association with the flat turret 16 installed on the automatically operated lathe, with reference to FIGS. 4 and 5. The positioning device 14 further includes a driving mechanism 60 for bringing a tool 56 or 58 to be positioned, among plural kinds of tools such as turning tools 56 and drills 58 mounted on the flat turret 16, into contact or abutment with the front side 12a of the strip member 12 wrapped on the bar 18; a contact-position deciding section 62 for detecting a conduction due to the power feeder 10 between the tool 56 or 58 and the front side 12a of the strip member 12 when they are brought into contact with each other, to decide or determine a position of contact with the tool 56, 58; and a corrective processing section 64 for determining the position of a center axis 18a of the bar 18, on the basis of the decided position of contact with the tool 56 or 58, and properly correcting the predetermined machining-position data for the tool 56, 58 in accordance with the determined position of the center axis 18a. The power feeding mechanism 22 of the power feeder 10 cooperates with the external power source 54, so as to function to impart a potential difference between the tool 56, 58 to be positioned and the front side 12a of the strip member 12, when the tool and the front side are not in contact with each other, as well as to pass an electric current between the tool 56, 58 and the front side 12a of the strip member 12 when they are mutually contacted or abutted with each other.

The driving mechanism 60 translates or moves in parallel the flat turret 16 in rectangular two-axis directions (e.g., X-axis and Y-axis directions in a rectangular three-axis coordinate system given on the lathe bed) within a plane orthogonal to the center axis 18a of the bar 18 securely held by the rotary spindle of the automatically operated lathe. In this case, it is advantageous that the driving mechanism 60 is constructed of a driving mechanism of the automatically operated lathe (such as, respective-axis servo motors and feed-screw units) for driving the flat turret 16 at the time of the machining work. The flat turret 16 includes a plurality of tool-mounting sections 66, 68 for detachably supporting the plural turning tools 56 and drills 58 in a parallel layout, and a base plate 70 for carrying integrally the tool-mounting sections 66, 68. The flat turret 16 is installed on the lathe bed near the spindle stock 24 of the automatically operated lathe.

At the time of selecting a tool to be positioned, the driving mechanism 60 translates or moves in parallel the flat turret 16 in the Y-axis direction (along the parallel layout of the turning tools 56 and drills 58) at a location where the noses 56a of the turning tools 56 and the tip ends 58a of the drills 58 are free of contact with the bar 18. Then, at the instant when the turning tool 56 or the drill 58 to be positioned has been substantially aligned with the center axis 18a of the bar 18 in the X-axis direction, the selection of the tool is completed. From this position, the driving mechanism 60 moves in parallel the flat turret 16 in the X-axis direction, and brings the selected turning tool 56 or drill 58 into abutment with the bar 18 in the manner as described later.

On the tool-mounting sections 66 of the flat turret 16, it is possible to mount plural kinds of turning tools 56 for performing a profile machining to the bar 18, such as a straight turning or a cutting-off. In this case, it is important that, at the time of completing the tool selection, the turning tools 56 are mounted in such a manner as to be able to dispose the noses 56a thereof always at a position generally the same distance from the center axis 18a of the bar 18. It is thus advantageous that, prior to the machining work, the noses of the turning tools 56 mounted on the flat turret 16 are arranged substantially on a common reference plane (i.e., an Y-Z plane) parallel to both a Z-axis parallel with the center axis 18a of the bar 18 and the above-described Y-axis. In this specification, "the nose of the turning tool" essentially means a corner of a cutting part. Further, on the tool-mounting sections 68 of the flat turret 16, it is possible to mount plural kinds of drills 58 for drilling the lateral face of the bar 18 by a driving operation of an exclusive rotation drive source (not shown).

For example, in the case where a plurality of turning tools 56 and drills 58 are used for machining one bar 18, the preliminary positioning operation of the turning tool 56 or the drill 58 relative to the center axis 18a of the bar 18 is usually performed each time when the tools are replaced with each other. Also, for example, even in an identical turning tool 56, it is necessary to periodically carry out the preliminary positioning operation if a high dimensional accuracy is required for a machined product, because a relative positional relationship between the nose 56a and the center axis 18a of the bar 18 is changed due to the abrasion of the nose 56a due to a turning process. Therefore, it is advantageous to automatically perform the preliminary positioning operation under a predetermined control flow, as a preparatory step in a sequence of automatic machining works in the automatically operated lathe. The positioning device 14 automatically performs the preliminary positioning operation for the plural tools 56, 58 by operating the driving mechanism 60, the contact-position deciding section 62 and the corrective processing section 64, in association with a controlling section 72 (e.g., an NC control section) of the automatically operated lathe, as described below.

The contact-position deciding section 62 is constructed from a line 74 for electrically connecting between the electrode pole 52 of the power feeder 10, the external power source 54 and the base plate 70 of the flat turret 16; a conduction sensor (e.g., an ammeter) 76 installed within the line 74; and the controlling section 72 of the automatically operated lathe, connected to the conduction sensor 76. When the tool 56 or 58 to be positioned is brought into contact or abutted with the front side 12a of the strip member 12 wrapped on the bar 18 by the driving operation of the driving mechanism 60, in a condition where the external power source 54 is connected to the electrode pole 52 of the power feeder 10 and the flat turret 16, the tool 56 or 58 is electrically connected to the front side 12a of the strip member 12, and thus the conduction sensor 76 detects an electric current flowing in the line 74. The controlling section 72 processes a current detection signal from the conduction sensor 76, and decides a position of a contact point with the tool 56 or 58 as coordinate data in the X-Y coordinate system on the lathe bed.

The corrective processing section 64 is constructed from the controlling section 72 of the automatically operated lathe, and an operating section 78 connected to the controlling section 72. The operating section 78 carries out a predetermined operation on the basis of the coordinate data of the position of the contact point with the tool 56 or 58 decided by the controlling section 72, so as to determine the position of the center axis 18a of the bar 18 as coordinate data in the X-Y coordinate system on the lathe bed. The controlling section 72 corrects predetermined machining-position data (a tool tip-end position at the time of completing the selection, a cut depth during the machining, a setback or standby position during the waiting for the machining, and so on) for individual tools 56, 58, previously entered in a storage part in the controlling section, on the basis of the coordinate data of the center axis 18a of the bar 18 determined through the operating section 78 (in the case of the NC lathe, an offset-data storage area is rewritten). In this manner, the actual position of the tip end or nose of each tool 56, 58, required for the machining work, is determined in accordance with the position of the center axis 18a of the bar 18. Then, the controlling section 72 controls the driving mechanism 60 to drive the flat turret 16, on the basis of the machining-position data thus corrected, and performs the machining work for the bar 18 with the desired tool 56, 58, through the above-described tool-selecting operation.

The operating flow of a preliminary positioning operation for the tool by the positioning device 14 will be explained in more detail below, with reference to FIGS. 6 to 7C.

First, desired kinds of turning tools 56 and drills 58, necessary for the machining, are mounted on the flat turret 16, and the bar 18 to be machined is fixedly held in the rotary spindle, so as to dispose the leading end of the bar at a machining work position with the leading end projecting from the collet chuck or the guide bush 28 by a suitable length (step S1). In this step, the noses 56a of the turning tools 56 are arranged substantially on the common reference plane (the Y-Z plane) parallel to both the Y-axis and the Z-axis on the lathe bed, preferably by using an exclusive gauge or a nose arranging unit.

Next, the base 26 of the power feeder 10 is fixed to the spindle stock 24 at a predetermined position thereon, and the strip member 12 is stretched between the roller 42 and the bar 18 while the front side 12a of the strip member 12 is brought into contact with the electrode pole 52 (step S2). In this respect, the electrode pole 52 is located oppositely about the bar 18 to the turning tool 56 or the drill 58 to be positioned, and thereby, the strip member 12 is supported convergently on the electrode pole 52 substantially symmetrically with the X-axis on the lathe bed (FIG. 4). The external power source 54 is connected to the electrode pole 52 via the line 74 that is in turn connected at the other end to the base plate 70 of the flat turret 16. The strip member 12 is applied with tension due to the elastic member 44, so that the front side 12a thereof is closely attached to the electrode pole 52 and the back side 12b is closely attached to the portion of the external peripheral surface of the bar 18 over the central angle of 180 degrees or above (FIG. 1).

Then, either a first program or a second program is selected; in the first program, only the turning tool 56 or the drill 58 that has been selected for carrying out the machining work, among the plural turning tools 56 and drills 58 mounted on the flat turret 16, is preliminarily positioned at each time of the tool selection, and in the second program, all the turning tools 56 are preliminarily positioned in sequence or one after another, prior to the starting of the machining (step S3). Note, the drills 58 are capable of being applied only to the first program. Although not shown, for a turret tool rest capable of being moved both in the X-axis direction and the Y-axis direction, the positioning device 14 can perform the preliminary positioning operation of the tools mounted on a turret in a flow similar to that in the flat turret 16, by moving the turret tool rest in the X-axis and Y-axis directions, after a tool has been selected due to the indexing rotation of the turret. Also in this case, either the first program for positioning only the selected tool each time of the tool selection for the machining work, or the second program for positioning all the tools in sequence prior to the starting of the machining, is selected.

Figure 7A:
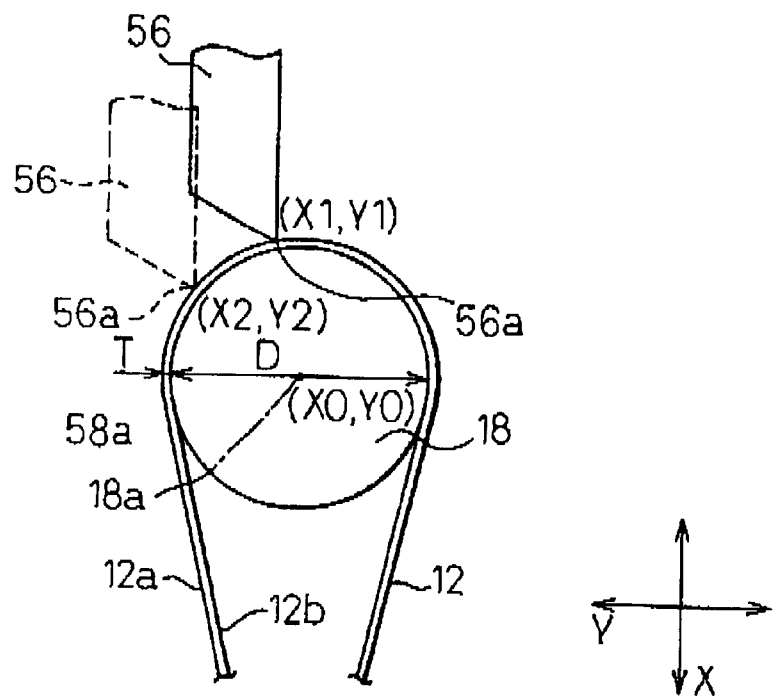
FIG. 7A is a schematic diagram showing a concept of two-point contact method with a turning tool, for explaining the tool-abutting step in the positioning flow shown in FIG. 6.
Figure 7B:
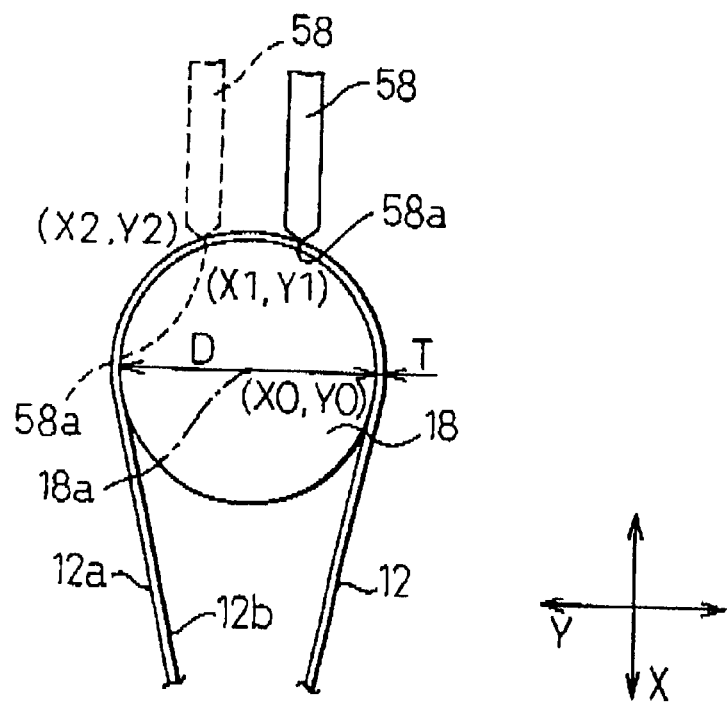
FIG. 7B is a schematic diagram showing a concept of two-point contact method with a drill, for explaining the tool-abutting step.

Next, in step S4, the driving mechanism 60 drives the flat turret 16 under the control of the controlling section 72, so as to select the turning tool 56 or the drill 58 to be positioned, and to bring the nose 56a of the turning tool 56 or the tip end 58a of the drill 58 into contact or abutment with, e.g., two desired positions in sequence, in the front side 12a of the strip member 12 within an area closely-attached to the external peripheral surface of the bar 18 (FIGS. 7A and 7B). Then, as described above, the contact-position deciding section 62 decides one by one, as X-Y coordinate data, two positions of contact between the front side 12a of the strip member 12 and the nose 56a of the turning tool 56 or the tip end 58a of the drill 58 (step S5). Next, based on the decided coordinate data of the two positions of contact, the corrective processing section 64 carries out a predetermined operation and determines a position of the center axis 18a of the bar 18 in the X-Y coordinates (step S6).

In the above-described steps S4 to S6, the driving mechanism 60, the contact-position deciding section 62 and the corrective processing section 64 can perform the driving of the flat turret 16, the deciding of the contact positional coordinate data and the determining of the center coordinates of the bar, respectively, by assuming the position of the center axis 18a of the bar 18 to be an origin (0, 0) in the X-Y coordinates (see FIGS. 7A and 7B). In this respect, in step S4, the driving mechanism 60 first moves in parallel the flat turret 16 in the Y-axis direction, according to a Y coordinate value (Y1) designated by assuming the position of the center axis 18a of the bar 18 to be the origin (0, 0), so as to locate the tool 56, 58 to be positioned at a desired position substantially aligned to the bar 18 in the X-axis direction. The position of the flat turret 16 at the time of completing the tool selection is referred to as a home position. Then, the flat turret 16 is moved in parallel in the X-axis direction from the home position, so that the nose 56a of the turning tool 56 or the tip end 58a of the drill 58, thus selected, is brought into abutment with the front side 12a of the strip member 12 wrapped on the bar 18.

Next, in step S5, the contact-position deciding section 62 detects an electrical conduction between the turning tool 56 or the drill 58 and the front side 12a of the strip member 12 provided by the power feeder 10, and calculates an X coordinate value (X1) of the contact point with the turning tool 56 or the drill 58. In this respect, the coordinates of the home position of the flat turret 16 as well as the distance in the X-axis direction between the home position and the tip end 56a, 58a of the selected tool 56, 58 on the flat turret 16 located at the home position are stored as predetermined values in the storage area of the controlling section 72, so that the X coordinate value of the contact point is calculated on the basis of the moving distance of the flat turret 16 in the X-axis direction until the tool contact has occurred, and as a result, the coordinate data (X1, Y1) of one position of contact is decided. Subsequently, the above-described operation is carried out under the designation of another Y coordinate value (Y2), so that the coordinate data (X2, Y2) of another position of contact is also decided.

Next, in step S6, the corrective processing section 64 calculates the positional coordinates (X0, Y0) of the center axis 18a of the bar 18, corresponding to the actual tool tip end 56a, 58a, from the coordinate data (X1, Y1) and (X2, Y2) of the two contact positions. In this respect, it is necessary to previously enter the data concerning the diameter D of the bar 18 and the thickness T of the strip member 12 into the storage part of the controlling section 72. In this case, the thickness T of the strip member 12 can be entered as a predetermined value, but the diameter D of the bar 18 is entered by measuring it with a micrometer or the like at each time when the bar 18 is replaced. Alternatively, in a state where the strip member 12 is wrapped on the bar 18, the dimension of the outer diameter (D+T) of a wrapped area of the strip member 12 may be entered by measuring it with a micrometer or the like. The corrective processing section 64 performs, in the operating section 78, an operation using trigonometric functions, to determine the positional coordinates (X0, Y0) of the center axis 18a of the bar 18, from the coordinate data of the two contact positions decided by the contact-position deciding section 62 and the data of the outer diametric dimension of the winding area of the strip member 12.

Figure 6:
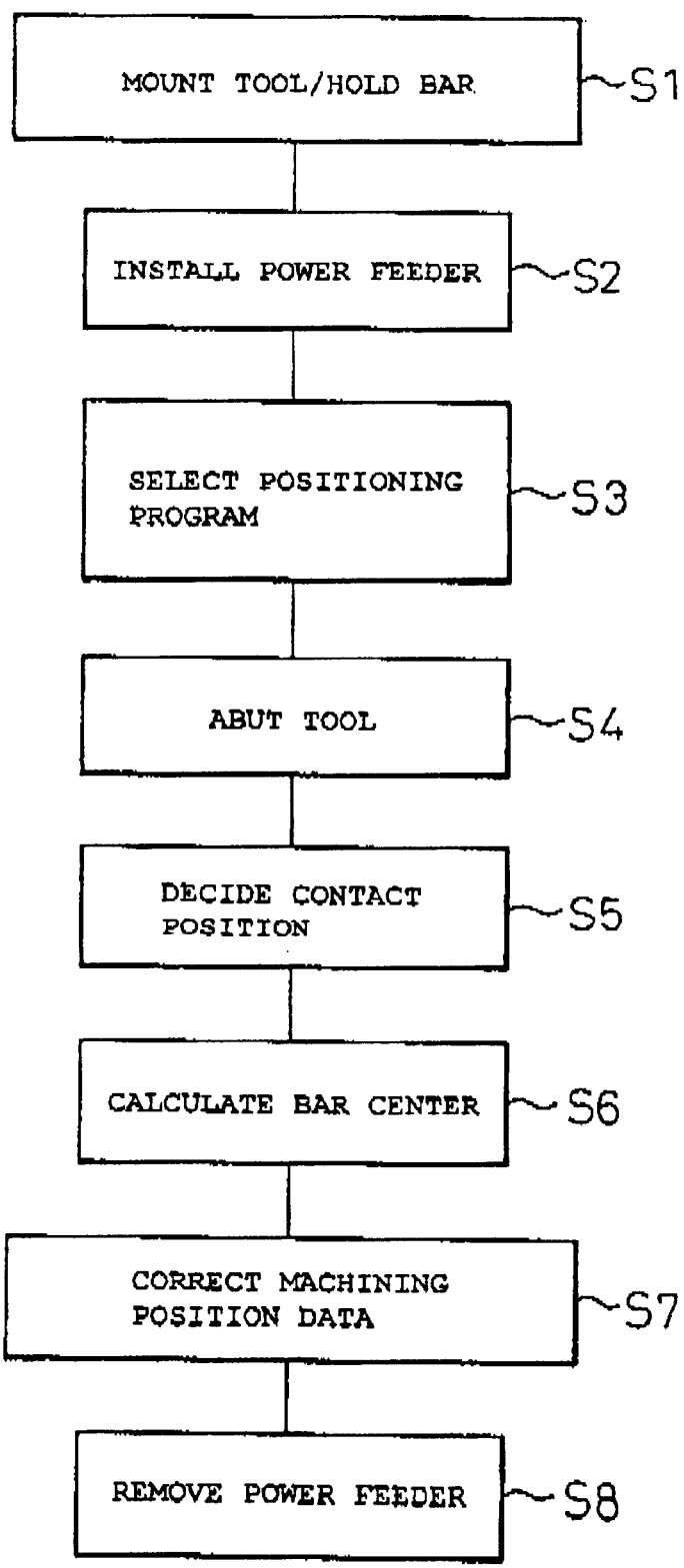
FIG. 6 is a flowchart of a tool positioning operation using the tool-positioning device shown in FIG. 4.

Referring again to the flowchart of FIG. 6, in step S7, the controlling section 72 corrects the predetermined machining-position data (a tool tip-end position at the time of completing the selection, a cut depth during the machining, a setback or standby position during the waiting for the machining, and so on) for the turning tool 56 or the drill 58 to be positioned, previously stored in the storage part in the controlling section, on the basis of the coordinate data of the coordinate data of the center axis 18a of the bar 18 determined through the operating section 78 (that is, in such a manner as to regard a point (X0, Y0) as an origin), as described above. The positioning operation of the objective tool 56, 58 is completed in this manner. Lastly, the base 26 of the power feeder 10 is removed from the spindle stock 24 (step S8). Thereafter, based on the corrected machining-position data, the controlling section 72 controls the driving mechanism 60 to drive the flat turret 16, so as to machine the bar 18 in a condition where the turning tool 56 or the drill 58 has been automatically positioned in relation to the center axis 18a of the bar 18.

It should be noted that, in the case where the first program is selected in step S3, the subsequent steps S4 to S7 are performed only for one turning tool 56 or one drill 58 to be used in an immediately after machining work, and the machining-position data of the tool concerned is corrected. On the other hand, in the case where the second program is selected in step S3, the subsequent steps S4 to S7 are performed for all the turning tools 56 on the flat turret 16, and the correction of the machining-position data of all the turning tools 56 is completed in advance. In this case, each time when any one of the turning tools 56 is selected during the machining of the bar 18, the selected turning tool 56 machines the bar 18 on the basis of the machining-position data automatically corrected or positioned relative to the center axis 18 of the bar 18 in the above-described procedure.

Further, in the case where the tool to be positioned is the turning tool 56, it is also possible to provisionally turn the external peripheral surface of the bar 18 into an approximately true circle with the objective turning tool 56, before the power feeder 10 is installed on the spindle stock 24 in step S2, and carry out the following steps for the provisionally turned portion. According to this arrangement, it is possible to realize the positioning operation with higher precision.

Figure 17:
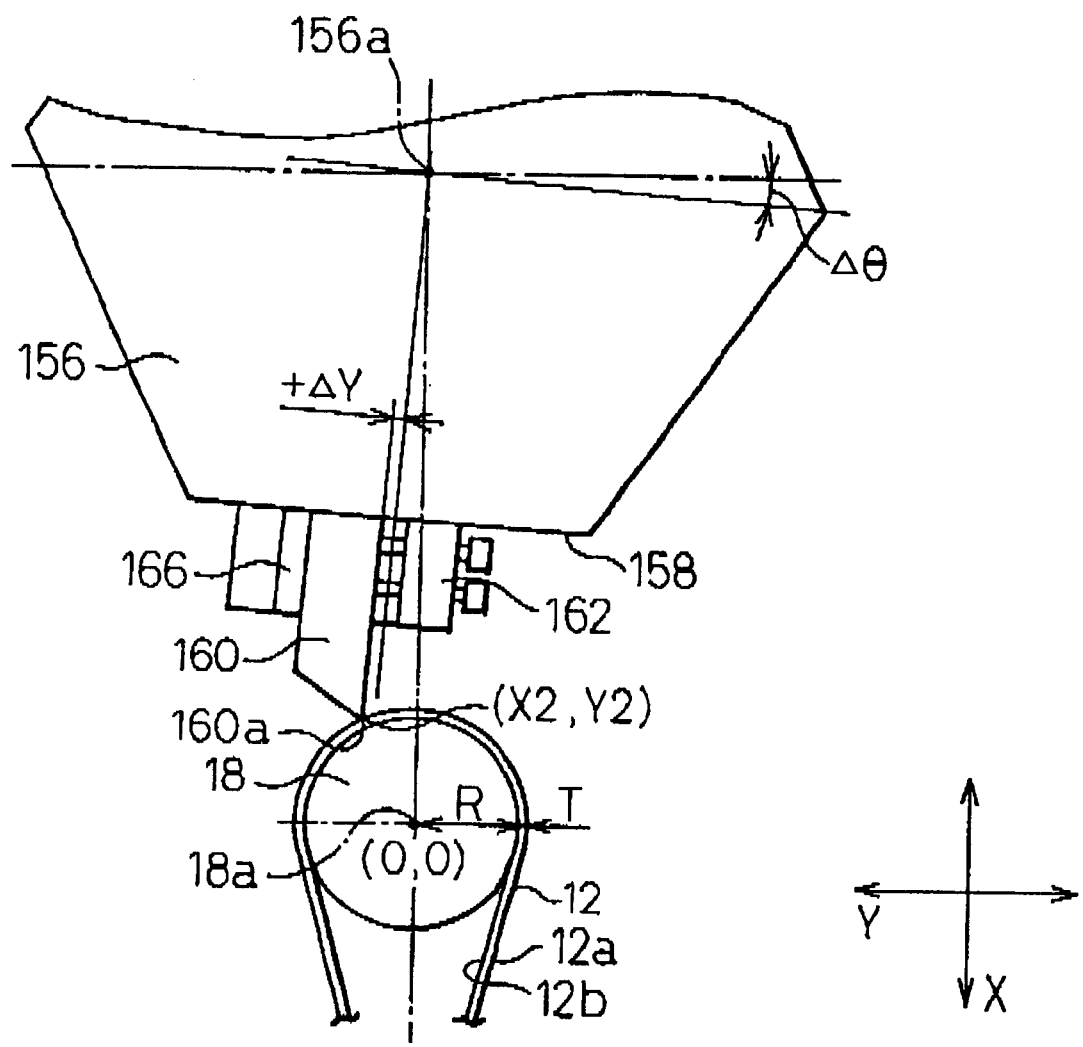
FIG. 17 is a schematic diagram for explaining an additional tool-abutting step in the tool-positioning device shown in FIG. 13.

Incidentally, in the case where the first program is selected in step 53 and the tool to be positioned is the drill 58, it is sometimes not possible to accurately determine the position of the center axis 18a of the bar 18 corresponding to the actual tip end 58a of the drill by the above-described operation under a two-point abutting procedure. This is because a flank 58c (FIG. 17C) adjacent to the tip end 58a of the drill 58 may be brought into contact with the front side 12a of the strip member 12, depending on a position of contact.

Therefore, in order to preliminarily position the drill 58, it is preferred that a lateral surface 58b of the drill 58 is first abutted or contacted in sequence with two points on the front side 12a of the strip member 12, opposite to each other in the Y-axis direction, within the area closely attached to the external peripheral surface of the bar 18, as shown in FIG. 7C. Then, the positional coordinates of the center axis 18a of the bar 18 is provisionally determined from the coordinate data (X1, Y1) and (X2, Y2) of the two contact positions decided by the contact-position deciding section 62, as well as the data of the outer diameter of the drill 58 and the data of the outer diameter (D+T) of the wrapping area of the strip member 12, both previously stored in the controlling section 72. The provisional positional coordinates of the center axis 18a thus determined do not include a deviation relative to the tip end 58a of the drill 58 in the X-axis direction. Therefore, the tip end 58a of the drill 58 is next brought into contact or abutment with the front side 12a of the strip member 12 at a position just above, in the X-axis direction, the provisional center axis 18a of the bar 18. Then, it is possible to determine the positional coordinates (X0, Y0) of the center axis 18a of the bar 18, from the coordinate data (X3, Y3) of the contact position and the outer diameter data of the wrapping area of the strip member 12.

In the above-described abutting step of the drill 58, if the back side 12b of the strip member 12 is not closely attached to the external peripheral surface of the bar 18 at the time of bringing the lateral surface 58b of the drill 58 into contact with the two points on the front side 12a of the strip member 12, mutually opposite in the Y-axis direction, it is not possible to accurately determine the positional coordinates of the center axis 18a of the bar 18. Therefore, it is extremely effective to closely attach the back side 12b of the strip member 12 to the portion of the external peripheral surface of the bar 18 over the central angle of 180 degrees or above, by converging the strip member 12 wrapped on the bar 18 onto the electrode pole 52 substantially symmetrically to the X-axis on the lathe bed, under the function of the electrode pole 52 as the guide unit of the wrapping mechanism 20 as previously described.

The positioning device and the positioning method, according to the present invention, do not restrict the number of positions of contact with a tool, for calculating the position of the center axis of the bar. Thus, it is also possible to sequentially bring, e.g., the nose 56a, of the turning tool 56 to be positioned, into contact or abutment with the desired three or more points on the front side 12a of the strip member 12. In this case, it is possible to calculate the outer diameter of the wrapping area of the strip member 12 from the coordinate data of at least three contact positions, so that it is not necessary to previously enter the data of the diameter of the bar 18 and of the thickness of the strip member 12 into the storage area of the controlling section 72. Further, in the case where the nose 56a of the turning tool 56 is positioned only in the X-axis direction without correcting the deviation of the nose 56a relative to the center axis 18a of the bar 18 in the Y-axis direction, such a procedure may be adopted that the nose 56a of the turning tool 56 is abutted only with one point in an upper area of the front side 12a of the strip member 12, on the basis of the previously stored Y coordinate value of the center axis 18a of the bar 18. For example, in the case of performing straight turning on the bar 18 with the turning tool 56, it is possible to ensure a certain level of machining accuracy by such a somewhat simple correcting operation, provided that the Y-axis deviation of the nose 56 is small.

Further, although not shown, it is also possible to automatically position a tool for machining the end surface of a bar, such as a drill, disposed generally in parallel with the center axis 18a of the bar 18 and facing oppositely to the rotary spindle, by calculating the position of the center axis 18a of the bar 18, according to the above-described arrangement of sequentially contacting the tip end of the tool to the desired three or more points on the front side 12a of the strip member 12.

As described above, the positioning device 14 including the power feeder 10 is constructed to perform the following steps, in order to determine the coordinate data of a desired point, on the external peripheral surface of the bar 18, that is required for calculating the position of the center axis 18a of the bar 18 corresponding to the actual tool tip end on the lathe bed: wrapping the strip member 12 on the external peripheral surface of the bar 18; bringing the tool 56, 58 into contact or abutment with a desired point on the conducting front side 12a of the strip member 12; and detecting an electrical conduction between the strip member 12 and the tool 56, 58 so as to decide the coordinates of the contact position. Accordingly, the tool 56, 58 is free of direct contact with the bar 18, so that it is possible to easily and accurately position the tip end 56a, 58a of the tool 56, 58 relative to the center axis 18a of the bar 18, prior to the machining work, without damaging the external peripheral surface of the bar 18 to be machined and/or the tool 56, 58 to be used for the machining.

Figure 8:
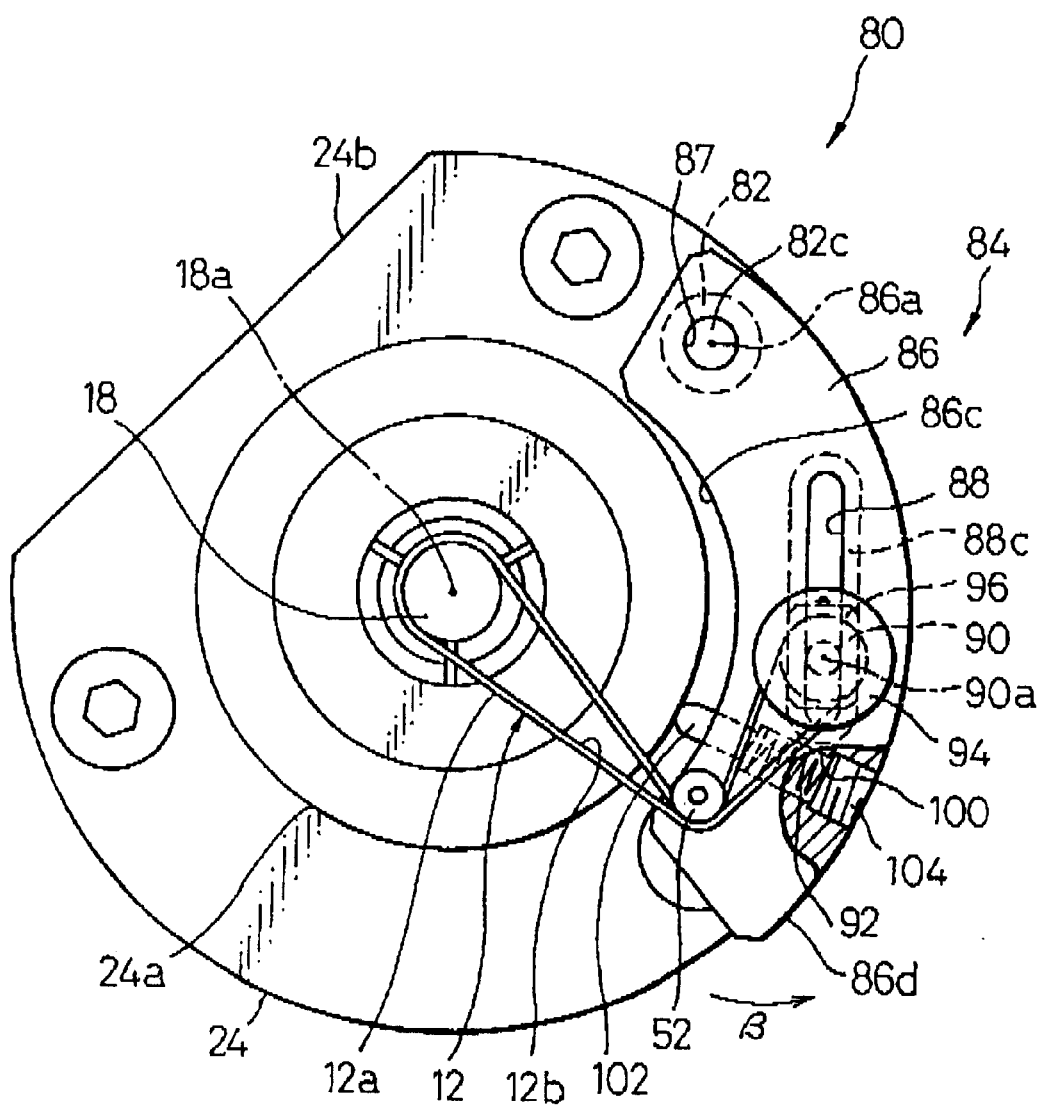
FIG. 8 is a front view of a power feeder for tool positioning, according to the second embodiment of the present invention.
Figure 9:
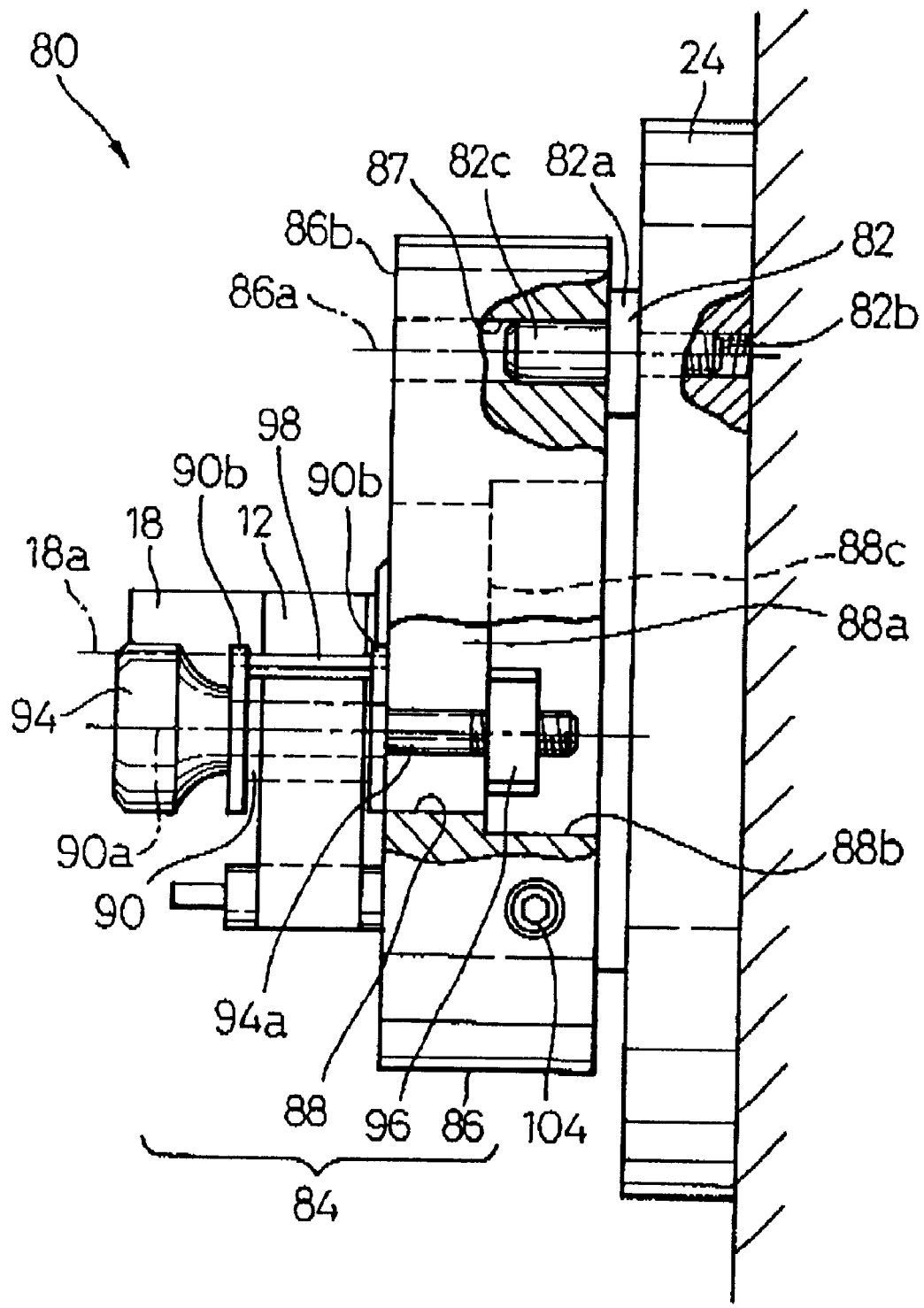
FIG. 9 is a partially sectional side view of the power feeder shown in FIG. 8.

FIGS. 8 and 9 are front and side views respectively showing a power feeder 80 according to a second embodiment of the present invention. The power feeder 80 has substantially the same structure as that of the above-described power feeder 10, except for the constructions of a base 82 fitted to a spindle stock 24 of an automatically operated lathe, and of a tension unit in a wrapping mechanism 84 for keeping a strip member 12 wrapped on the external peripheral surface of a bar 18 with a back side 12b being in close contact with the external surface. Therefore, the same or similar components are denoted by common reference numerals, and the description thereof is not repeated. The power feeder 80 may be incorporated for use into the positioning device 14 as described, in a way similar to the power feeder 10.

The base 82 of the power feeder 80 is integrally provided with a disc-shaped base portion 82a, a screw portion 82b projecting from one surface of the base portion 82a and a pivot part 82c projecting from the other surface of the base portion 82a. The base 82 is fixed to the spindle stock 24 through the screw portion 82b. The pivot part 82c of the base 82 is extended generally in parallel with a rotation axis of the rotary spindle, i.e., the center axis 18a of the bar 18.

The wrapping mechanism 84 of the power feeder 80 includes, as a tension unit for applying tension to the strip member 12, a swing arm 86 detachably fitted to the pivot part 82c of the base 82, a roller 90 supported in a sliding groove 88 having an elliptical shape formed in the swing arm 86, and an elastic member 92 for biasing the swing arm 86 in a counterclockwise direction (shown by an arrow β) in FIG. 8 about the pivot part 82c of the base 82. The swing arm 86 has a curved shape extending in a circular arc over a range of central angle of about 90 degrees. The swing arm 86 receives in a plugging manner the pivot part 82c of the base 82 in a hole 87 formed at one longitudinal end of the swing arm, so as to be rotatably supported by the pivot part 82c. In this state, the rotation axes 86a and 90a of the swing arm 86 and the roller 90 are disposed generally in parallel with the rotation axis of the rotary spindle, i.e., the center axis 18a of the bar 18.

The roller 90 is provided at the axially opposite ends thereof with flange portions 90b. The roller 90 is supported on a stem 94a of a knob bolt 94 with one flange portion 90b being slidably abutted to a front face 86b of the swing arm 86. The stem 94a of the knob bolt 94 extends through the roller 90 and is received in the sliding groove 88 of the swing arm 86. A stop nut 96 is screwed with the end portion of the stem 94a. The sliding groove 88 of the swing arm 86 is shaped into a stepped channel including a small-size portion 88a for receiving the stem 94a of the knob bolt 94 and a large-size portion 88b for receiving the stop nut 96 screwed with the end portion of the stem 94a.

When the knob bolt 94 is firmly screwed with the stop nut 96, the stop nut 96 comes into engagement with a shoulder face 88c defined between the small-size portion 88a and the large-size portion 88b of the sliding groove 88, so that the knob bolt 94 is fixedly held in an upright position on the swing arm 86. When the screw engagement between the knob bolt 94 and the stop nut 96 is loosened, the knob bolt 94 is permitted to shift in parallel on the swing arm 86 along the sliding groove 88 while the roller 90 is supported on the stem 94a. A pin 98 is provided to extend between the pair of flange portions 90b of the roller 90, for preventing the strip member 12 from falling out of the roller 90.

The elastic member 92 is formed from, e.g., a compression coil spring, and is accommodated in a stepped through-hole 100 recessed in the swing arm 86 in a direction generally orthogonal to the stem 94a of the knob bolt 94. The stepped through-hole 100 includes a smaller diameter portion opening in the arcuate inside face 86c of the swing arm 86 and receives therein a push rod 102 in a slidable and stoppable manner. The push rod 102 is held in a state that the distal end thereof projects by a predetermined length from the inside face 86c of the swing arm 86, under the biasing force of the elastic member 92. A retainer bolt 104 for compressively retaining the elastic member 92 within the through-hole 100 is screwed in a part of the stepped through-hole 100, opening in the arcuate outside face 86d of the swing arm 86. When the swing arm 86 is fitted to the pivot part 82c of the base 82, the stepped through-hole 100 extends substantially in a diametrical direction of the bar 18, and the distal end of the push rod 102 is abutted to the cylindrical portion 24a of the spindle stock 24.

When the swing arm 86 is fitted to the pivot part 82c of the base 82, the annular strip member 12 is stretched between the bar 18 and the roller 90 with the back side 12b being in contact with the respective external peripheral surfaces of the bar 18 and the roller 90. At this time, the push rod 102 is abutted to the cylindrical portion 24a of the spindle stock 24 under the biasing force of the elastic member 92, so as to bias the swing arm 86 in a direction shown by an arrow β. As a result, the strip member 12 is loaded with a tension so as to be kept in a condition where the back side 12b is closely attached to the respective external peripheral surfaces of the bar 18 and the roller 90. When the swing arm 86 is removed from the pivot part 82c of the base 82 and the strip member 12 is detached from the bar 18, the strip member 12 is held by the roller 90 and the pin 98 so as not to fall out of the swing arm 86.

In the tension unit of the wrapping mechanism 84 having the above structure, the pivoting stroke of the swing arm 86 given by the push rod 102 is relatively small. Therefore, if the diametrical dimension of the bar 18 is significantly changed, the tension loaded to the strip member 12 sometimes becomes insufficient, which may result in slack in the strip member 12. In this case, it is possible to apply proper tension to the strip member 12 by manipulating the knob bolt 94 so as to shift the roller 90 in parallel on the swing arm 86 along the sliding groove 88.

The wrapping mechanism 84 of the power feeder 80 is, also provided with a guide unit for closely attaching the strip member 12 wrapped on the bar 18 with the portion of the external peripheral surface of the bar 18 over the central angle of 180 degrees or above. The guide unit is constructed from an electrode pole 52 fixedly and uprightly provided on the swing arm 86 at the other end of the swing arm 86 opposite to the base 82. The electrode pole 52 is fixed at one end thereof to the swing arm 86 through an adhesive or the like. A portion of the electrode pole 52, projecting from the swing arm 86, slidably supports the front side 12a of the strip member 12.

When the swing arm 86 has been fitted to the pivot part 82c of the base 82, the electrode pole 52 extends generally in parallel with the rotation axis of the rotary spindle, i.e., the center axis 18a of the bar 18, and is located to be laterally deviated from a straight line linking the bar 18 to the roller 90 of the tension unit. Therefore, in this state, it is possible to hook the strip member 12, stretched between the bar 18 and the roller 90, around the electrode pole 52 with the front side 12a thereof being in contact with the external peripheral surface of the electrode pole 52. In this condition, under the tension due to the biasing function of the elastic member 92 of the tension unit, the annular strip member 12 is stretched in such a manner as to converge on the electrode pole 52 as shown, so that the back side 12b of the strip member 12 is closely attached to the portion of the external peripheral surface of the bar 18 over the central angle of 180 degrees or above.

In the illustrated embodiment, the flat turret 16 shown in FIG. 4 is installed oppositely to a lateral chord face 24b of the spindle stock 24. Therefore, when the swing arm 86 of the power feeder 80 is fitted to the pivot part 82c of the base 82 and the strip member 12 is stretched between the roller 90 and the bar 18 with the front side 12a being in contact with the electrode pole 52, the-electrode pole 52 is located oppositely about the bar 18 to the turning tool 56 or the drill 58 (FIG. 4) to be positioned. As a result, the strip member 12 also converges on the electrode pole 52 substantially symmetrically with the X-axis on the lathe bed.

The electrode pole 52 also functions as a power feeding mechanism of the power feeder 80, in a way similar to that in the power feeder 10. It is thus necessary to electrically insulate the electrode pole 52 from the spindle stock 24 on which the base 82 is fixed. To this end, for example, at least one of the base 82 and the swing arm 86 may be made of an insulating resinous material, or an insulating material may be interposed between the base 82 and the electrode pole 52.

It will be appreciated that the power feeder 80 having the above structure is capable of providing an operational effect similar to that in the power feeder 10 shown in FIG. 1. Particularly, according to the power feeder 80, it is possible to install the power feeder 80 at a predetermined position on the spindle stock 24, merely by fitting the swing arm 86 to the pivot part 82c of the base 82 in a plugging manner, which advantageously makes it possible for the power feeder 80 to be easily and quickly installed or removed. This structure is particularly effective in the case of repeatedly performing the corrections of tool machining-position data and the tests of machining, in order to improve the machining accuracy as far as possible, and thus is applicable to a high precision machining.

Figure 10:
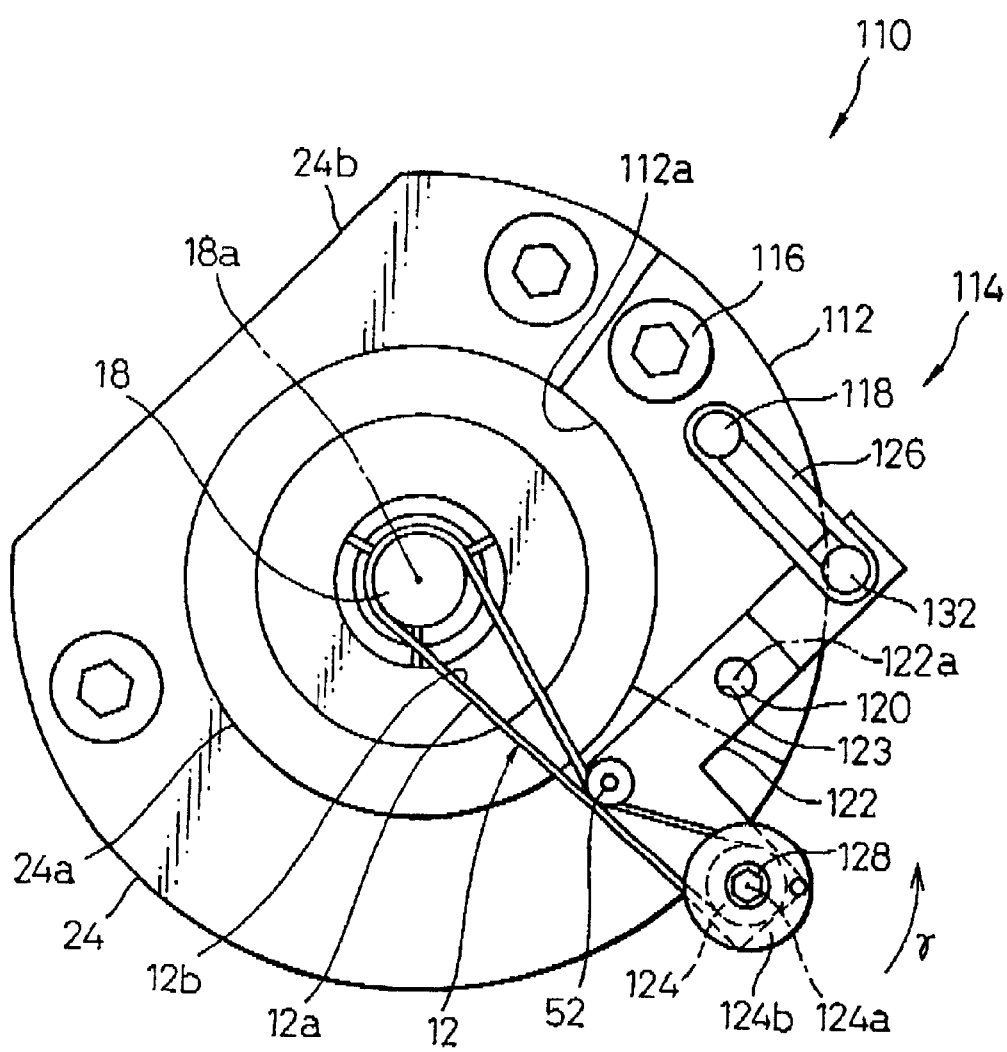
FIG. 10 is a front view of a power feeder for tool positioning, according to the third embodiment of the present invention.
Figure 11:
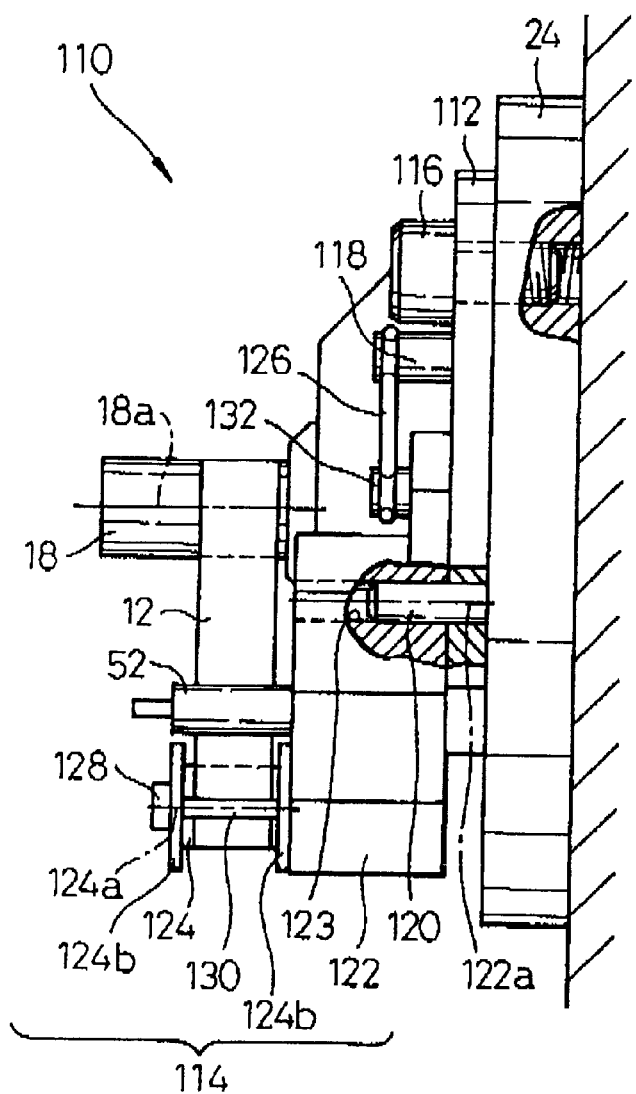
FIG. 11 is a partially sectional side view of the power feeder shown in FIG. 10.

FIGS. 10 and 11 are front and side views respectively showing a power feeder 110 according to a third embodiment of the present invention. The power feeder 110 has substantially the same structure as that of the above-described power feeder 10, except for the constructions of a base 112 fitted to a spindle stock 24 of an automatically operated lathe, and of a tension unit in a wrapping mechanism 114 for keeping a strip member 12 wrapped on the external peripheral surface of a bar 18 with a back side 12b being in close contact with the external surface. Therefore, the same or similar components are denoted by common reference numerals, and the description thereof is not repeated. The power feeder 110 may be incorporated for use into the positioning device 14 as described, in a way similar to the power feeder 10.

The base 112 of the power feeder 110 has a curved shape extending in a circular arc over a range of central angle of about 70 degrees, and is fixed at one longitudinal end thereof to the spindle stock 24 through a fixing bolt 116. In this respect, an arcuate inside face 112a of the base 112 is in close contact with the outer circumferential surface of a cylindrical portion 24a of the spindle stock 24, so that the base 112 is fixedly disposed at a predetermined position on the spindle stock 24. The base 112 is provided with a hanger shaft 118 uprightly projecting near the fixing bolt 116, and with a pivot 120 uprightly projecting at the other end region opposite to the fixing bolt 116. The hanger shaft 118 is fixed at one end thereof to the base 112 through, e.g., an adhesive. The pivot 120 is also fixed at one end thereof to the base 112 through, e.g., an adhesive.

The wrapping mechanism 114 of the power feeder 110 includes, as a tension unit for applying tension to a strip member 12, a swing arm 122 detachably fitted to the pivot 120 projecting on the base 112, a roller 124 supported at one end of the swing arm 122, and an elastic member 126 for biasing the swing arm 122 in a counterclockwise direction (an arrow γ) in FIG. 10 about the pivot 120. The swing arm 122 has generally an L-shape, and receives in a plugging manner the pivot 120 in a hole 123 formed at generally the center of a longer-arm section, so as to be rotatably supported by the pivot 120. When the base 112 is fixed at a predetermined position on the spindle stock 24 and the swing arm 122 is fitted to the pivot 120 in the plugging manner, the rotation axes 122a and 124a of the swing arm 122 and the roller 124 are disposed generally in parallel with the rotation axis of the rotary spindle, i.e., the center axis 18a of the bar 18.

The roller 124 is provided at the axially opposite ends thereof with flange portions 124b, and is supported on a free end region of a shorter-arm section of the swing arm 122 through a bolt 128. A pin 130 is provided to extend between the pair of flange portions 124b of the roller 124, for preventing the strip member 12 from falling out of the roller 124. The elastic member 126 is formed from, e.g., a rubber band, and is stretched between a hanger shaft 132 provided to uprightly project in the fee end region of the longer-arm section of the swing arm 122 and the hanger shaft 118 projecting from the base 112. The elastic member 126 may also be formed from another known elastic element, such as a tension spring.

When the swing arm 122 is fitted to the pivot 120 on the base 112, the annular strip member 12 is stretched between the bar 18 and the roller 124 with the back side 12b being in contact with the respective external peripheral surfaces of the bar 18 and the roller 124. At this time, a condition is maintained, where the back side 12b is closely attached to the respective external peripheral surfaces of the bar 18 and the roller 124, under the biasing force of the elastic member 126. When the swing arm 122 is removed from the pivot 120 and the strip member 12 is detached from the bar 18, the strip member 12 is held by the roller 124 and the pin 130 so as not to fall out of the swing arm 122.

The wrapping mechanism 114 of the power feeder 110 is also provided with a guide unit for closely attaching the strip member 12 wrapped on the bar 18 with the portion of the external peripheral surface of the bar 18 over the central angle of 180 degrees or above. The guide unit is constructed from an electrode pole 52 fixedly and uprightly provided on the swing arm 122 at a corner between the longer-arm and shorter-arm sections of the swing arm 122. The electrode pole 52 is fixed at one end thereof to the swing arm 122 with an adhesive or the like. A portion of the electrode pole 52, projecting from the swing arm 122, slidably supports the front side 12a of the strip member 12.

When the swing arm 122 is fitted to the pivot 120 on the base 112, the electrode pole 52 extends generally in parallel with the rotation axis of the rotary spindle, i.e., the center axis 18a of the bar 18, and is located to be laterally deviated from a straight line linking the bar 18 to the roller 124 of the tension unit. Therefore, in this state, it is possible to hook the strip member 12, stretched between the bar 18 and the roller 124, around the electrode pole 52 with the front side 12a thereof being in contact with the external peripheral surface of the electrode pole 52. In this condition, under the tension due to the biasing function of the elastic member 126 of the tension unit, the annular strip member 12 is stretched in such a manner as to converge on the electrode pole 52 as shown, so that the back side 12b of the strip member 12 is closely attached to the portion of the external peripheral surface of the bar 18 over the central angle of 180 degrees or above.

In the illustrated embodiment, the flat turret 16 shown in FIG. 4 is installed oppositely to a lateral chord face 24b of the spindle stock 24. Therefore, when the swing arm 122 of the power feeder 110 is fitted to the pivot 120 on the base 112 and the strip member 12 is stretched between the roller 124 and the bar 18 with the front side 12a being in contact with the electrode pole 52, the electrode pole 52 is located oppositely about the bar 18 to the turning tool 56 or the drill 58 (FIG. 4) to be positioned. As a result, the strip member 12 also converges on the electrode pole 52 substantially symmetrically with the X-axis on the lathe bed.

The electrode pole 52 also functions as a power feeding mechanism of the power feeder 110, in a way similar to that in the power feeder 10. It is thus necessary to electrically insulate the electrode pole 52 from the spindle stock 24 on which the base 112 is fixed. To this end, for example, at least one of the base 112 and the swing arm 122 may be made of an insulating resinous material, or an insulating material may be interposed between the base 112 and the electrode pole 52.

It will be appreciated that the power feeder 110 having the above structure is capable of providing an operational effect similar to that in the power feeder 10 shown in FIG. 1. Particularly, according to the power feeder 110, it is possible to install the power feeder 110 at a predetermined position on the spindle stock 24, merely by fitting the swing arm 122 to the pivot 120 on the base 112 in a plugging manner, which advantageously makes it possible for the power feeder 110 to be easily and quickly installed or removed. This structure is particularly effective in the case of repeatedly performing the corrections of tool machining-position data and the tests of machining, in order to improve the machining accuracy as far as possible, and thus is applicable to a high precision machining. Furthermore, unlike the power feeder shown in FIG. 8, it is possible to provide a sufficiently large pivoting stroke for the swing arm 122, so that, even when the diametrical dimension of the bar 18 is significantly changed, it is possible to apply sufficient tension to the strip member 12. Also, after completing a high-precision positioning by repeating the corrections of machining-position data and the tests of machining, it is possible to dismount the power feeder 110 from the spindle stock 24, by extracting the fixing bolt 116, while the swing arm 122 is kept mounted on the base 112.

Figure 12:
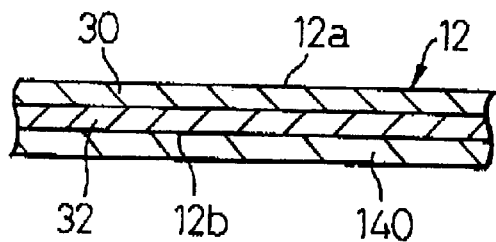
FIG. 12 is a sectional view showing a modification of a strip member used in the power feeder.

While several preferred embodiments of a power feeder according to the present invention have been explained above, the present invention is not restricted to these embodiments. For example, as a wrapping mechanism for keeping the strip member wrapped on the bar with the back side closely attached to the external peripheral surface of the bar, an adhesive for detachably adhering the back side of the strip member to the external peripheral surface of the bar may be adopted. In this case, an adhesive layer 140 is advantageously affixed on the back side 12b of the strip member 12, as shown in FIG. 12. Alternatively, the back layer 32 of the strip member 12 may be made of an electrically insulating adhesive. According to this structure, it is possible to easily and closely attach the strip member 12 to the portion of the external peripheral surface of the bar over the central angle of 180 degrees or above, regardless of the diametrical dimension of the bar, without using the tension unit and the guide unit of the wrapping mechanisms 20, 84 and 114, respectively in the above embodiments.

Figure 13:
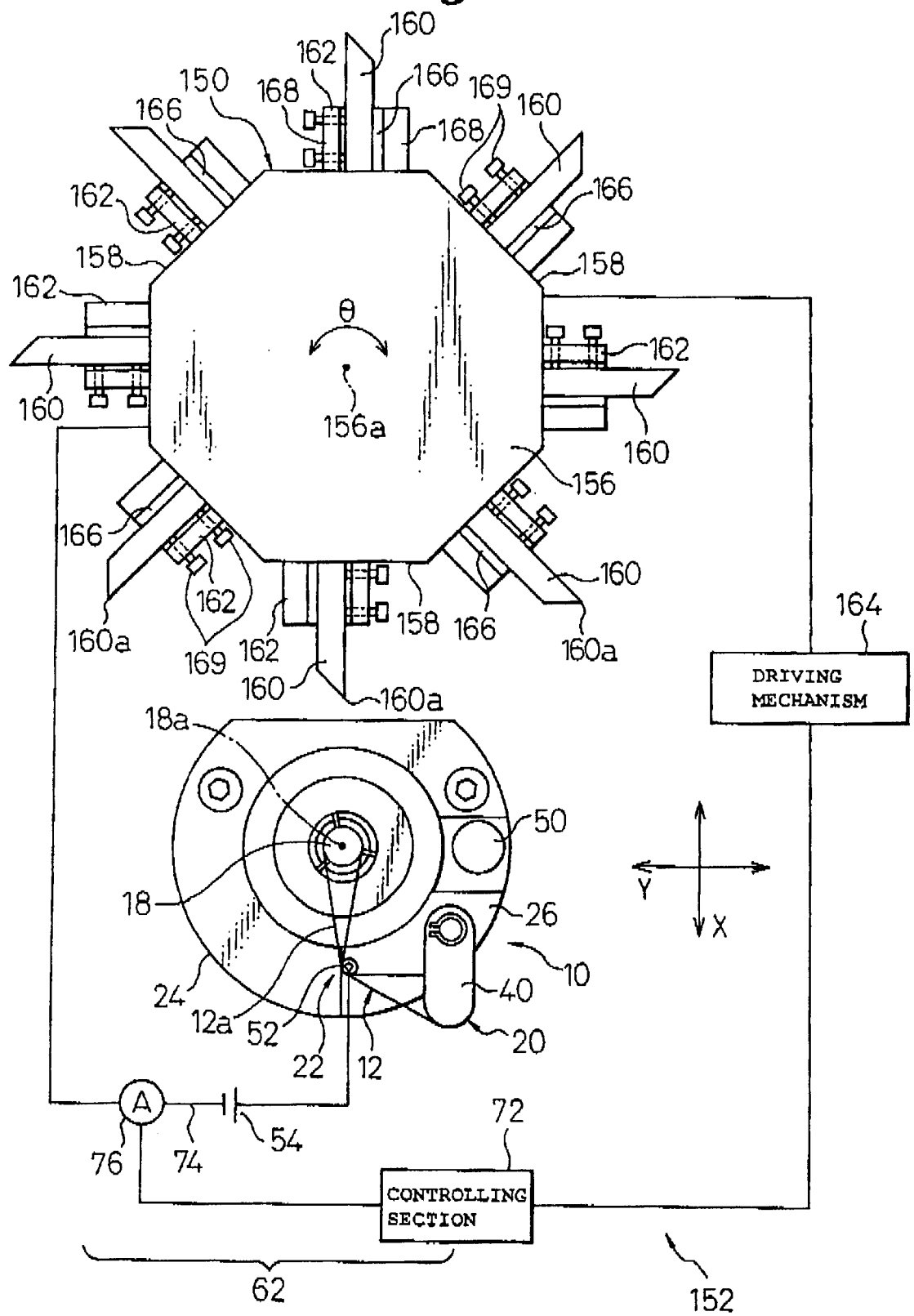
FIG. 13 is a front view of a tool-positioning device, according to another embodiment of the present invention, and partially shown in a block diagram, together with a bar and a turret tool rest.
Figure 14:
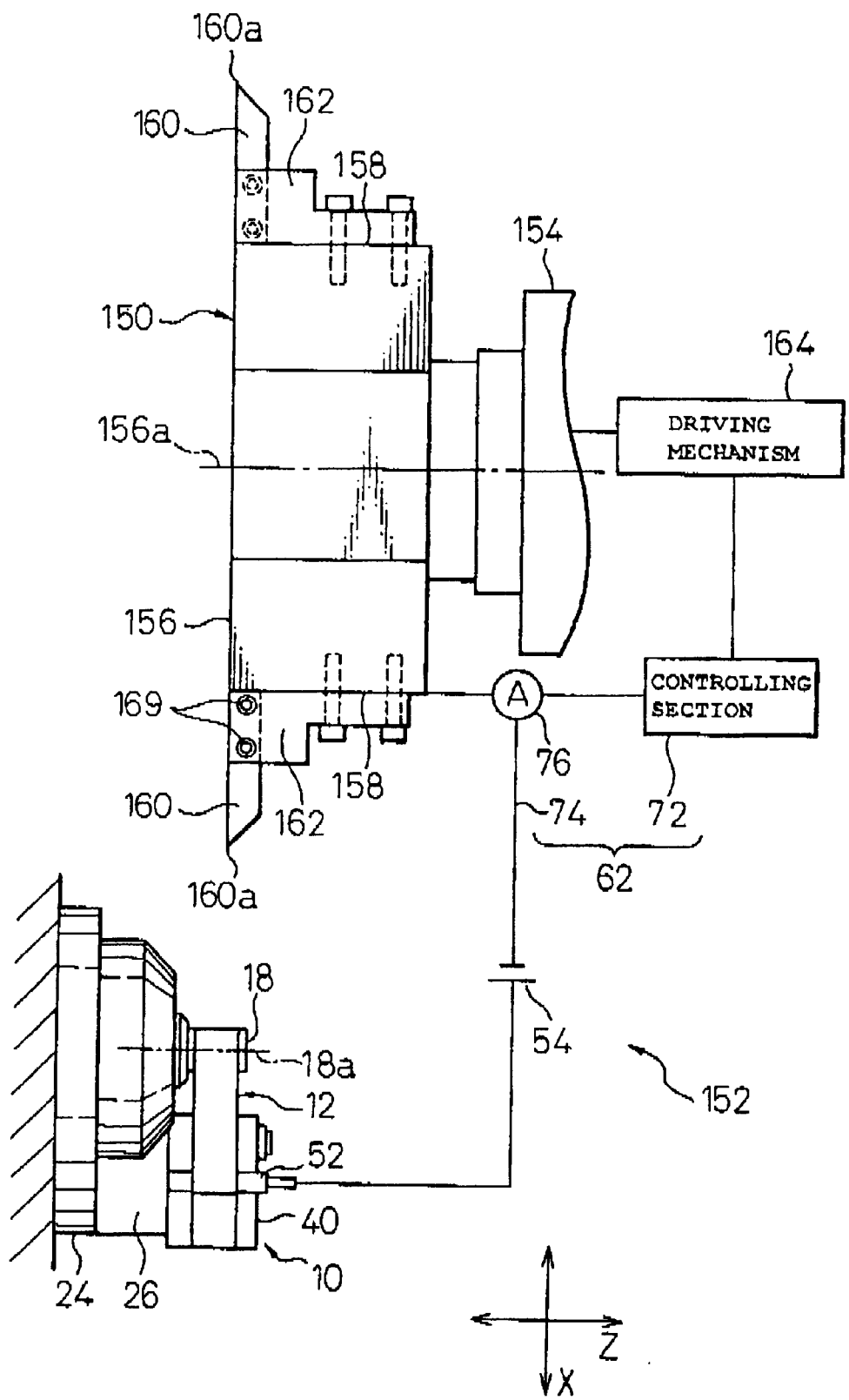
FIG. 14 is a side view of the tool-positioning device in FIG. 13, partially shown in a block diagram, together with the bar and the turret tool rest.

Further, as already described, the positioning device according to the present invention is capable of being installed in association with the other type of tool rest, such as a turret tool rest. FIGS. 13 and 14 are front and side views respectively showing a positioning device 152, according to the other embodiment of the present invention, installed in association with a turret tool rest 150. The positioning device 152 has substantially the same structure as that of the above-described positioning device 14, except for the structures of a driving mechanism and a corrective processing section. Therefore, the same or similar components are denoted by common reference numerals, and the description thereof is not repeated.

The turret tool rest 150 includes a tool rest body 154 installed near a spindle stock 24 on a lathe bed of an automatically operated lathe, and a turret 156 supported on the tool rest body 154. The tool rest body 154 is arranged to be movable in both a Z-axis direction parallel with the axis of a rotary spindle not shown, i.e., the center axis 18a of a bar 18 and an X-axis direction orthogonal to the center axis 18a, in a given rectangular three-axis coordinate system on the lathe bed. The turret 156 is disposed rotatably in a θ direction about an axis 156a extending in parallel with the Z-axis on the tool rest body 154. The axis 156a of the turret 156 and the center axis 18a of the bar 18 are mutually aligned in the X-axis direction.

The turret 156 is provided in the external peripheral area thereof.with a plurality (eight in FIG. 13) of tool-mounting sections 158 at predetermined indexing-angle pitches about the rotation axis 156a of the turret 156. On the tool-mounting sections 158, various kinds of tools 160, such as turning tools, are mounted through tool holders 162. The turret tool rest 150 automatically selects a tool 160 mounted on a desired tool-mounting section 158, by the indexing rotation of the turret 156 in the θ direction on the tool rest body 154, so as to dispose the selected tool 160 at an indexed position opposite to the bar 18.

As explained above, the turret tool rest 150, to which the positioning device 152 is applied, performs a tool selection depending on the indexing rotation of the turret 156 on the tool rest body 154, and thus, unlike the flat turret 16 as described, the tool rest body 154 cannot, in itself, move in the Y-axis direction on the lathe bed. Therefore, in order to position the tip end of the tool 160 relative to the center axis 18a of the bar 18 securely held in a rotary spindle, the positioning device 152 adopts a structure of mechanically positioning the tool 160 at a desired position on the tool-mounting section 158 of the turret 156, instead of controlling the Y-axis feed rate of the turret tool rest 150.

That is, in addition to the components of the power feeder 10 as already described, the positioning device 152 further includes a driving mechanism 164 for bringing a tool 160 to be positioned, among plural kinds of tools mounted on the turret tool rest 150, into contact or abutment with the front side 12a of the strip member 12 wrapped on the bar 18; a contact-position deciding section 62 for detecting a conduction due to the power feeder 10 between the tool 160 and the front side 12a of the strip member 12 when they are brought into contact with each other, to decide or determine a position of contact with the tool 160; and a positioning member for mechanically positioning the tip end 160a of the tool 160 relative to the center axis 18a of the bar 18 to be machined, on the basis of the determined position of contact with the tool 160.

In the illustrated embodiment, the positioning member is constructed from the above-described tool holders 162 for fixedly supporting the tools 160, and spacers 166 mounted on the tool holders 162 for determining the positions of the tools 160. Further, a power feeding mechanism 22 of a power feeder 10 cooperates with an external power source 54, so as to function to impart a potential difference between the tool 160 to be positioned and the front side 12a of the strip member 12, when the tool and the front side are not in contact with each other, as well as to pass an electric current between the tool 160 and the front side 12a of the strip member 12 when they are mutually contacted or abutted with each other.

The driving mechanism 164 performs, simultaneously or mutually independently, a linear driving for translating or moving, in parallel, the turret tool rest 150 in the X-axis direction orthogonal to the center axis 18a of the bar 18 securely held in the rotary spindle, and a rotary driving for rotating the turret 156 on the tool rest body 154 in the θ direction about the axis 156a parallel to the center axis 18a. Therefore, it is advantageous that the driving mechanism 164 is constructed from a driving mechanism of the automatically operated lathe (such as, respective-axis servo motors and feed-screw units) for driving the turret tool rest 150 at the time of the machining work.

At the time of selecting a tool to be positioned, the driving mechanism 164 rotates the turret 156 in an indexing manner in the θ direction, at a location where the tip ends 160a of the tools 160 are free of contact with the bar 18. Thereby, a tool 160 to be positioned is disposed at an indexed position, and the tip end 160a of this tool 160 and the center axis 18a of the bar 18 are disposed substantially in alignment with each other in the X-axis direction. From this position, the driving mechanism 164 moves in parallel the turret tool rest 150 in the X-axis direction, and brings the selected tool 160 into abutment with the bar 18 in the manner as described later.

The positioning device 152 operates the driving mechanism 164 and the contact-position deciding section 62, in association with a controlling section 72 (e.g., an NC control section) of the automatically operated lathe, in a way similar to the positioning device 14 as described. The contact-position deciding section 62 is constructed from a line 74 for electrically connecting between the electrode pole 52 of the power feeder 10, the external power source 54 and the turret 156 of the turret tool rest 150; a conduction sensor (e.g., an ammeter) 76 installed within the line 74; and the controlling section 72 of the automatically operated lathe, connected to the conduction sensor 76. When the tool 160 to be positioned is brought into contact with the front side 12a of the strip member 12 wrapped on the bar 18 by the driving operation of the driving mechanism 164, in a condition where the external power source 54 is connected to the electrode pole 52 of the power feeder 10 and the turret 156, the tool 160 is electrically connected to the front side 12a of the strip member 12, and thus the conduction sensor 76 detects an electric current flowing in the line 74. The controlling section 72 processes a current detection signal fed from the conduction sensor 76, and decides a position of a contact point with the tool 160 as coordinate data in the X-Y coordinate system on the lathe bed.

Each tool holder 162 is constructed from a pair of holding members 168 detachably fitted to the tool-mounting section 158 of the turret 156, and fastening bolts 169 used for fixedly holding the tool 160 and the spacer 166 between the holding members 168 under a compression force. The fastening bolts 169 are screwed into threaded holes formed in one of the holding members 168. The spacer 166 mounted on the tool holder 162 is a thin-plate member held together with the tool 160 adjacent to each other between the pair of holding members 168 of the tool holder 162, as illustrated, and serves to locate the tool 160 substantially in parallel with the X-axis. Therefore, by suitably selecting a spacer 166 from among those having various thickness and mounting the selected spacer 166 on the tool holder 162 through an exchanging step, it is possible to translate or move in parallel the tool 160 in a lateral direction (a Y-axis direction at the indexed position) on the tool-mounting section 158 of the turret 156, and to adjust the position of the tip end 160a of the tool 160.

After X-Y coordinate data of the contact point with the tool 160 is determined by the contact-position deciding section 62, a deviation value of the tip end 160a of this tool 160 in the Y-axis direction, relative to the center axis 18a of the bar 18 to be machined (i.e., from a X-Z plane including the center axis 18a), is specified on the basis of a Y coordinate value in the coordinate data. Then, the spacer 166 having a thickness corresponding to this deviation value is selected and mounted on the tool holder 162, which makes it possible to position the tip end 160a of the tool 160 in the X-Z plane including the center axis 18a.

Figure 15:
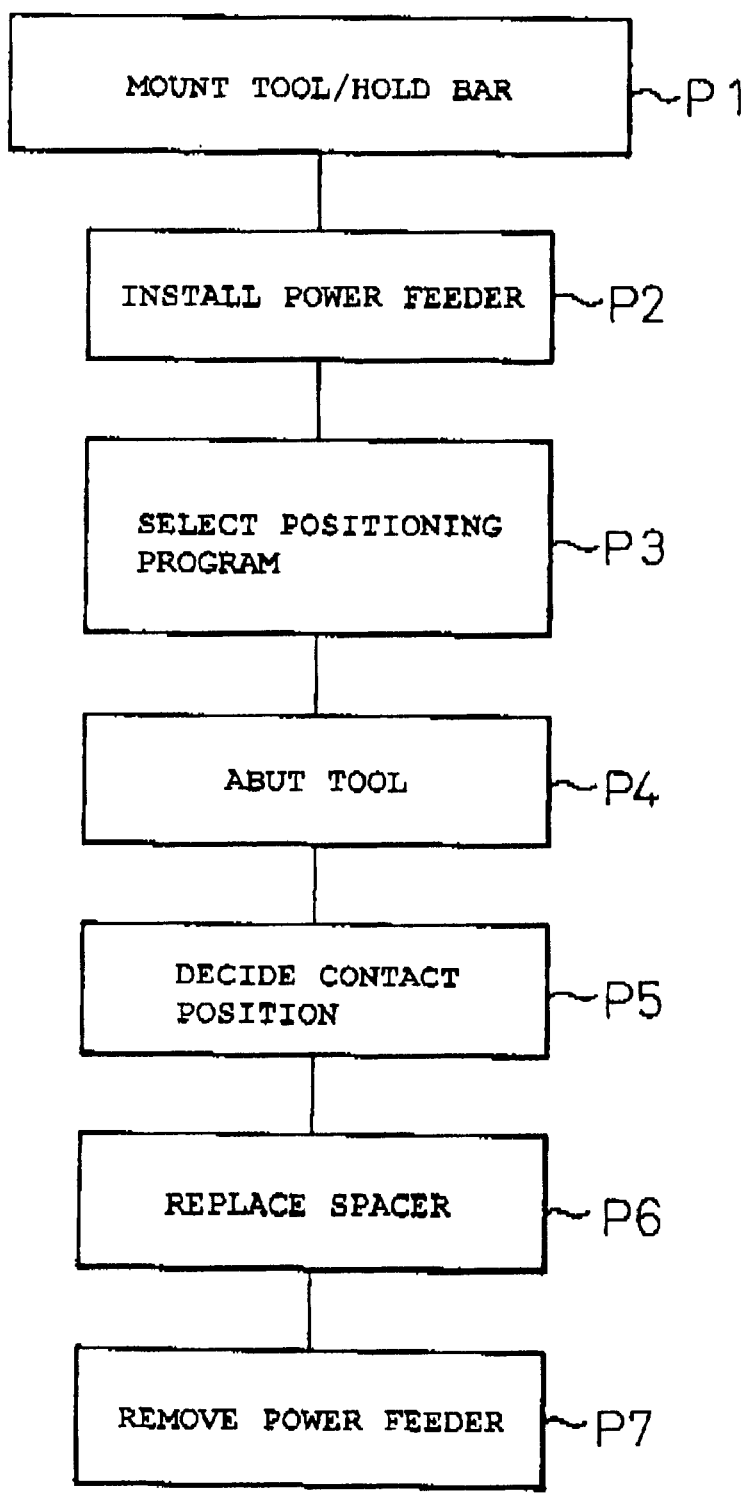
FIG. 15 is a flowchart of a tool positioning operation using the tool-positioning device shown in FIG. 13.

The operating flow of a preliminary positioning operation for the tool by the positioning device 152 will be explained in more detail below, with reference to FIGS. 15 and 16.

First, desired kinds of tools 160 necessary for the machining are mounted on the turret tool rest 150, and the bar 18 to be machined is fixedly held in the rotary spindle, so as to dispose the leading end of the bar at a machining work position with the leading end projecting from the collet chuck or the guide bush 28 by a suitable length (step P1). In this step, each tool 160 is fixedly disposed in the tool holder 162 on each tool-mounting section 158, by using a spacer 166 having, e.g., a reference thickness.

Next, the base 26 of the power feeder 10 is fixed to the spindle stock 24 at a predetermined position thereon, and the strip member 12 is stretched between the roller 42 and the bar 18 with the front side 12a of the strip member 12 being in contact with the electrode pole 52 (step P2). In this respect, the electrode pole 52 is located opposite, about the bar 18, to the tool 160 to be positioned and, thereby, the strip member 12 is supported convergently on the electrode pole 52 substantially symmetrical with the X-axis on the lathe bed (FIG. 13). The external power source 54 is connected to the electrode pole 52 via the line 74 that is in turn connected at the other end to the turret 156 of the turret tool rest 150.

Then, either a first program or a second program is selected; in the first program, only the tool 160 that has been selected for carrying out the machining work, among the plural tools 160 mounted on the turret tool rest 150, is preliminarily positioned at each time of the tool selection and, in the second program, all the tools 160 are preliminarily positioned in sequence or one after another, prior to the starting of the machining (step P3).

Figure 16:
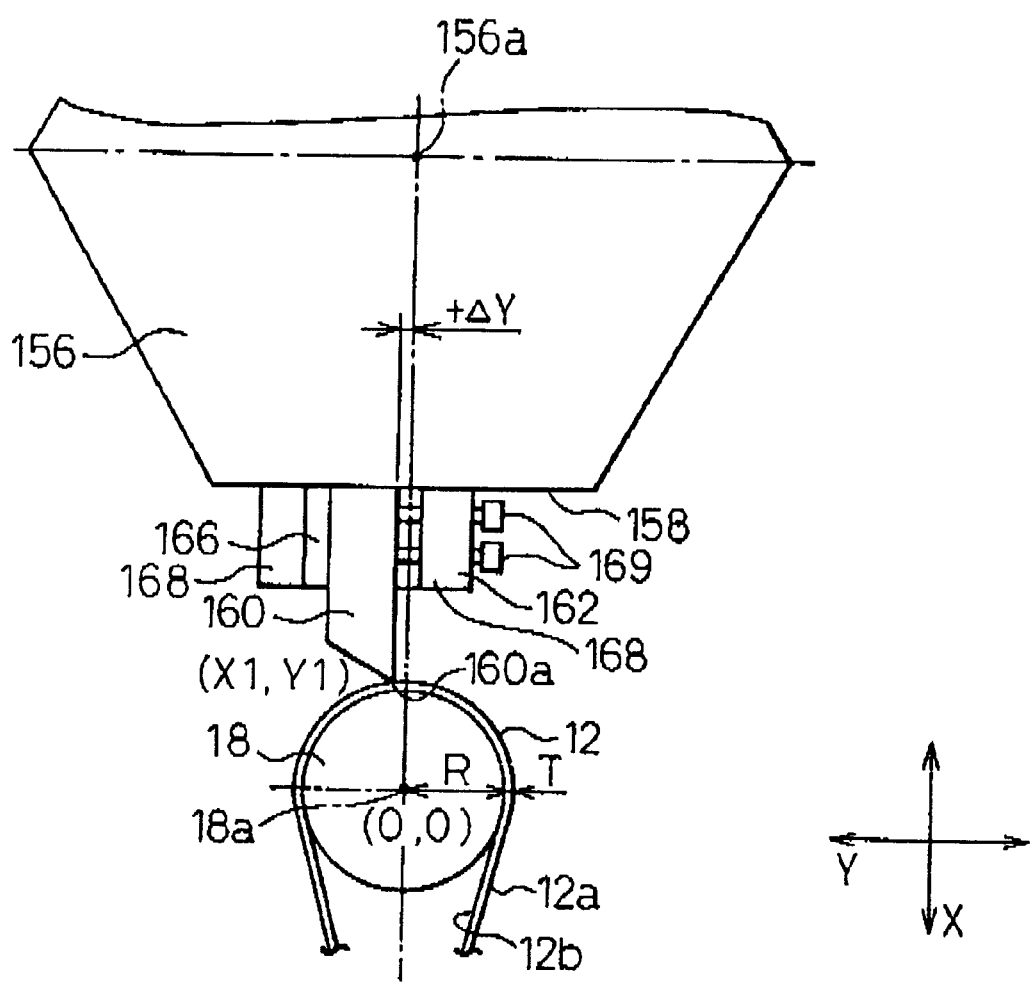
FIG. 16 is a schematic diagram for explaining a tool-abutting step in the tool-positioning device shown in FIG. 13.

Next, in step P4, the driving mechanism 164 drives the turret tool rest 150 under the control of the controlling section 72, so as to select the tool 160 to be positioned, and to bring the tip end 160a of the tool 160 into contact or abutment with the front side 12a of the strip member 12 within an area closely-attached to the external peripheral surface of the bar 18 (FIG. 16). Then, as described above, the contact-position deciding section 62 decides, as X-Y coordinate data, the position of contact between the tip end 160a of the tool 160 and the front side 12a of the strip member 12 (step P5). Next, based on the determined coordinate data of the position of contact, a deviation value ΔY of the tip end 160a of the tool 160 in the Y-axis direction is specified, a spacer 166 having a thickness corresponding to this deviation value ΔY is selected, and the spacer 166 having the reference thickness is replaced with the spacer 166 of the thickness ΔY (step P6).

In the above-described steps P4 to P6, the driving mechanism 164 and the contact-position deciding section 62 can perform the driving of the turret tool rest 150, and the determining of the contact positional coordinate data, by assuming the position of the center axis 18a of the bar 18 to be an origin (0, 0) in the X-Y coordinates. In this respect, in step P4, the driving mechanism 164 first drives the turret tool rest 150 for an indexing rotation in the θ direction, so as to locate the tool 160 to be positioned at an indexed position substantially aligned to the bar 18 in the X-axis direction. The position of the turret axis 156a of the turret tool rest 150 at the time of completing the tool selection is referred to as a home position. Then, the turret tool rest 150 is moved in parallel in the X-axis direction from the home position, so that the nose 160a of the selected tool 160 is brought into abutment with the front side 12a of the strip member 12 wrapped on the bar 18.

Next, in step P5, the contact-position deciding section 62 detects an electrical conduction between the tool 160 and the front side 12a of the strip member 12 provided by the power feeder 10, and calculates an X coordinate value (X1) and a Y coordinate value (Y1) of the contact point with the tool 160. In this respect, the coordinates of the home position of the turret tool rest 150, and the distance in the X-axis direction between the turret axis 156a of the turret tool rest 150 and the tip end 160a of the tool 160 to be positioned are stored as predetermined values in the storage part of the controlling section 72, so that the X coordinate value of the contact point is calculated on the basis of the moving distance of the turret tool rest 150 in the X-axis direction until the tool contact is occurred. Further, data concerning the radius R (an actually measured value) of the bar 18 and the thickness T of the strip member 12 are previously entered in the storage part of the controlling section 72, so that the Y coordinate value of the contact point is calculated as a point on the circle having the radius (R+T). As a result, the coordinate data (X1, Y1) of the contact point is decided.

Then, in step P6, the deviation value ΔY=|Y1| of the tip end 160a of the tool 160 in the Y-axis direction is specified, a spacer 166 having a thickness Y1 is selected, and the spacer 166 having the reference thickness mounted previously on the tool holder 162 is replaced with the spacer 166 of the thickness Y1. In this manner, the positioning of the tool 160 is completed. Lastly, the base 26 of the power feeder 10 is removed from the spindle stock 24 (step P7). Thereafter, the controlling section 72 controls the driving mechanism 164 to drive the turret tool rest 150, so as to machine the bar 18 in a condition where the tool 160 has been positioned in relation to the center axis 18a of the bar 18.

It should be noted that, in the case where the first program is selected in step P3, the subsequent steps P4 to P6 are performed only for one tool 160 to be used in an immediately after machining work, and the tip-end position of the tool concerned is corrected. On the other hand, in the case where the second program is selected in step P3, the subsequent steps P4 and P5 are performed to all the tools 160 on the turret tool rest 150, and thereafter the tip-end positions of all tools 160 are previously corrected, in step P6, on the basis of the respective ΔY of the respective tools 160.

Incidentally, in the above step P5, it is sometimes not possible to specify, as a predetermined value, the distance in the X-axis direction from the turret axis 156a of the turret tool rest 150 to the tip end 160a of the tool 160 to be positioned. In this case, in step P4, after the tip end 160a of the tool 160 allocated in the indexed position is brought into contact with the front side 12a of the strip member 12, the turret tool rest 150 is moved back to the home position and the turret 156 is slightly rotated by a desired minute angle Δθ. While holding this state, the tip end 160a of the tool 160 is again brought into contact or abutment with another point on the front side 12a of the strip member 12 (see FIG. 17). Then, the moving distances of the turret tool rest 150 in the X-axis direction in these two contact steps as well as the slight rotation angle Δθ of the turret 156 are considered as predetermined values, so as to solve simultaneous equations. Thereby, it is possible to determine the distance in the X-axis direction from the turret axis 156a of the turret tool rest 150 to the tip end 160a of the tool 160 to be positioned. As a result, it is possible to decide the coordinate data (X1, Y1) of the first contact position, and thus to specify the deviation value ΔY=|Y1| of the tip end 160a of the tool 160 in the Y-axis direction.

It will be appreciated that the positioning device 152 having the above structure is capable of providing an operational effect similar to that in the positioning device 14 as already described.

While several preferred embodiments of the present invention have been explained above, the present invention is not restricted to these embodiments, and various changes and modifications may be made within the disclosure of claims.

INDUSTRIAL APPLICABILITY

The present invention is directed to a tool-positioning method and a tool-positioning device, capable of easily and accurately positioning the tip end of a tool relative to the center axis of a bar without damaging the external peripheral surface of the bar and/or the tool in itself, prior to the starting of a machining. Also, the present invention provides a power feeder capable of being used for such a tool-positioning operation and capable of preventing the external peripheral surface of a bar and/or the tool in itself from being damaged, prior to the starting of a machining. When the positioning method, the positioning device and the power feeder are applied to an automatically operated lathe, it is possible to realize high-precision machining of a product.

What is claimed is:

1. A tool-positioning method for positioning a tip end of a tool relative to a center axis of a bar, comprising:

providing a flexible strip member having a conducting front side and an insulating back side;

fixedly disposing a bar to be machined at a machining work position, and wrapping said strip member on an external peripheral surface of said bar with said back side being closely attached to the external peripheral surface;

bringing a tool to be positioned into contact with said front side of said strip member;

detecting a conduction between said tool and said front side of said strip member at a time of a mutual contact, to decide a position of a contact point with said tool; and determining a position of a tip end of said tool during a machining, on the basis of the position of the contact point with said tool as decided.

2. The tool-positioning method as set forth in claim 1, wherein said determining of a position of a tip end of said tool includes a work of determining a position of a center axis of said bar to be machined on the basis of the position of the contact point with said tool as decided, and a work of suitably correcting predetermined machining-position data of said tool in accordance with the position of the center axis of said bar as determined.

3. The tool-positioning method as set forth in claim 1, wherein said determining of a position of a tip end of said tool includes a work of mechanically positioning said tip end of said tool relative to a center axis of said bar to be machined, on the basis of the position of the contact point with said tool as decided.

4. A tool-positioning device for positioning a tip end of a tool relative to a center axis of a bar, comprising:

a flexible strip member having a conducting front side and an insulating back side;

a wrapping mechanism for keeping said strip member wrapped on an external peripheral surface of a bar to be machined, the bar being fixedly disposed at a machining work position, with said back side of said strip member being closely attached to the external peripheral surface;

a driving mechanism for bringing a tool to be positioned into contact with said front side of said strip member;

a power feeding mechanism for allowing an electric current to flow between the tool and said front side of said strip member at a time of a mutual contact;

a contact-position deciding section for detecting a conduction between the tool and said front side of said strip member caused due to said power feeding mechanism, to decide a position of a contact point with the tool; and a corrective processing section for determining a position of a center axis of the bar on the basis of the position of the contact point with said tool as decided, and suitably correcting predetermined machining-position data of said tool in accordance with the position of the center axis of the bar as determined.

5. The tool-positioning device as set forth in claim 4, wherein said strip member has an annular shape.

6. The tool-positioning device as set forth in claim 4, wherein said wrapping mechanism includes a tension unit for applying tension to said strip member.

7. The tool-positioning device as set forth in claim 4, wherein said wrapping mechanism includes a guide unit for closely attaching said strip member to a portion of the external peripheral surface of the bar over a central angle of 180 degrees or above.

8. The tool-positioning device as set forth in claim 4, wherein said wrapping mechanism includes an adhesive for detachably adhering said back side of said strip member to the external peripheral surface of the bar.

9. The tool-positioning device as set forth in claim 4, wherein said wrapping mechanism and said power feeding mechanism are detachably fitted to a spindle stock of an automatically operated lathe.

10. The tool-positioning device as set forth in claim 9, wherein said power feeding mechanism includes an electrode member contacting with said front side of said strip member and insulated from the spindle stock.

11. The tool-positioning device as set forth in claim 4, wherein the tool is mounted on a tool rest of an automatically operated lathe, and said driving mechanism comprises a tool-rest driving mechanism in the automatically operated lathe.

12. The tool-positioning device as set forth in claim 4, wherein said contact-position deciding section includes a controlling section in an automatically operated lathe.

13. The tool-positioning device as set forth in claim 4, wherein said corrective processing section includes a controlling section in an automatically operated lathe.

14. A tool-positioning device for positioning a tip end of a tool relative to a center axis of a bar, comprising:
    a flexible strip member having a conducting front side and an insulating back side;
    a wrapping mechanism for keeping said strip member wrapped on an external peripheral surface of a bar to be machined, the bar being fixedly disposed at a machining work position, with said back side of said strip member being closely attached to the external peripheral surface;
    a driving mechanism for bringing a tool to be positioned into contact with said front side of said strip member;
    a power feeding mechanism for allowing an electric current to flow between the tool and said front side of said strip member at a time of a mutual contact;
    a contact-position deciding section for detecting a conduction between the tool and said front side of said strip member caused due to said power feeding mechanism, to decide a position of a contact point with the tool; and
    a positioning member for mechanically positioning a tip end of the tool relative to a center axis of the bar to be machined, on the basis of the position of the contact point with the tool as decided.

15. The tool-positioning device as set forth in claim 14, wherein said strip member has an annular shape.

16. The tool-positioning device as set forth in claim 14, wherein said wrapping mechanism includes a tension unit for applying tension to said strip member.

17. The tool-positioning device as set forth in claim 14, wherein said wrapping mechanism includes a guide unit for closely attaching said strip member to a portion of the external peripheral surface of the bar over a central angle of 180 degrees or above.

18. The tool-positioning device as set forth in claim 14, wherein said wrapping mechanism includes an adhesive for detachably adhering said back side of said strip member to the external peripheral surface of the bar.

19. The tool-positioning device as set forth in claim 14, wherein said wrapping mechanism and said power feeding mechanism are detachably fitted to a spindle stock of an automatically operated lathe.

20. The tool-positioning device as set forth in claim 19, wherein said power feeding mechanism includes an electrode member contacting with said front side of said strip member and insulated from the spindle stock.

21. The tool-positioning device as set forth in claim 14, wherein the tool is mounted on a tool rest of an automatically operated lathe, and said driving mechanism comprises a tool-rest driving mechanism in the automatically operated lathe.

22. The tool-positioning device as set forth in claim 14, wherein said contact-position deciding section includes a controlling section in an automatically operated lathe.

23. The tool-positioning device as set forth in claim 14, wherein said positioning member comprises a holder for fixedly supporting the tool, and a spacer mounted on the holder for determining a position of the tool.

24. A power feeder for tool positioning, for positioning a tip end of a tool relative to a center axis of a bar, comprising:
    a flexible strip member having a conducting front side and an insulating back side a
    wrapping mechanism for keeping said strip member wrapped on an external peripheral surface of a bar, with said back side of said strip member being closely attached to the external peripheral surface; and
    a power feeding mechanism electrically connected to said front side of said strip member.

25. The power feeder as set forth in claim 24, wherein said strip member has an annular shape.

26. The power feeder as set forth in claim 24, wherein said wrapping mechanism includes a tension unit for applying tension to said strip member.

27. The power feeder as set forth in claim 24, wherein said wrapping mechanism includes a guide unit for closely attaching said strip member to a portion of the external peripheral surface of the bar over a central angle of 180 degrees or above.

28. The power feeder as set forth in claim 24, wherein said wrapping mechanism includes an adhesive for detachably adhering said back side of said strip member to the external peripheral surface of the bar.

29. The power feeder as set forth in claim 24, capable of being detachably installed on a spindle stock of an automatically operated lathe.

30. The power feeder as set forth in claim 29, wherein said power feeding mechanism includes an electrode member contacting with said front side of said strip member and insulated from the spindle stock.

* * * * *

UNITED STATES PATENT AND TRADEMARK OFFICE
CERTIFICATE OF CORRECTION

PATENT NO. : 6,636,777 B1
DATED : October 21, 2003
INVENTOR(S) : Kunihiko Kokubo et al.

It is certified that error appears in the above-identified patent and that said Letters Patent is hereby corrected as shown below:

Title page,
Item [75], Inventors, "Kunihiro" should read -- Kunihiko --.

Column 26,
Line 36, "side a" should read -- side; --.
Line 37, before "wrapping mechanism", insert -- a --.

Signed and Sealed this

Thirteenth Day of September, 2005

JON W. DUDAS
*Director of the United States Patent and Trademark Office*